(12) United States Patent
Wright et al.

(10) Patent No.: US 8,429,012 B2
(45) Date of Patent: Apr. 23, 2013

(54) USING ESTIMATED AD QUALITIES FOR AD FILTERING, RANKING AND PROMOTION

(75) Inventors: Daniel Wright, Millbrae, CA (US); Daryl Pregibon, Summit, NJ (US); Diane Tang, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 12/890,271

(22) Filed: Sep. 24, 2010

(65) Prior Publication Data

US 2011/0015988 A1    Jan. 20, 2011

Related U.S. Application Data

(63) Continuation of application No. 11/321,064, filed on Dec. 30, 2005, now Pat. No. 7,827,060.

(51) Int. Cl.
 *G06Q 30/00*    (2012.01)
(52) U.S. Cl.
 USPC ..................................... 705/14.41; 705/14.42
(58) Field of Classification Search ............... 705/14.41, 705/14.42
 See application file for complete search history.

(56) References Cited

U.S. PATENT DOCUMENTS

| | | |
|---|---|---|
| 5,794,210 A | 8/1998 | Goldhaber et al. |
| 5,848,396 A | 12/1998 | Gerace |
| 5,918,014 A | 6/1999 | Robinson |
| 5,937,390 A | 8/1999 | Hyodo |
| 5,937,392 A | 8/1999 | Alberts |
| 5,948,061 A | 9/1999 | Merriman et al. |
| 6,006,197 A | 12/1999 | D'Eon et al. |
| 6,006,222 A | 12/1999 | Culliss |
| 6,009,409 A | 12/1999 | Adler et al. |
| 6,014,665 A | 1/2000 | Culliss |
| 6,078,901 A | 6/2000 | Ching |
| 6,078,916 A | 6/2000 | Culliss |
| 6,097,566 A | 8/2000 | Heller et al. |
| 6,182,068 B1 | 1/2001 | Culliss |
| 6,260,064 B1 | 7/2001 | Kurzrok |
| 6,285,999 B1 | 9/2001 | Page |
| 6,334,110 B1 * | 12/2001 | Walter et al. ............... 705/14.41 |
| 6,338,066 B1 | 1/2002 | Martin et al. |
| 6,356,879 B2 | 3/2002 | Aggarwal et al. |
| 6,430,539 B1 | 8/2002 | Lazarus et al. |
| 6,539,377 B1 | 3/2003 | Culliss |

(Continued)

FOREIGN PATENT DOCUMENTS

| | | |
|---|---|---|
| JP | 2002-245336 A | 8/2002 |
| JP | 2002-366838 A | 12/2002 |

(Continued)

OTHER PUBLICATIONS

Office Action from U.S. Appl. No. 11/321,076, dated Dec. 1, 2010, 17 pages.

(Continued)

*Primary Examiner* — James W Myhre
(74) *Attorney, Agent, or Firm* — Harrity & Harrity, LLP

(57) ABSTRACT

A system obtains a first parameter ($QP_1$) associated with a quality of an advertisement among multiple advertisements, where the first quality parameter ($QP_1$) does not include a click through rate (CTR). The system functionally combines the first quality parameter ($QP_1$) with at least one other parameter and uses the functional combination to filter, rank or promote the advertisement among the multiple advertisements.

21 Claims, 30 Drawing Sheets

U.S. PATENT DOCUMENTS

| | | | |
|---|---|---|---|
| 6,567,786 B1 | 5/2003 | Bibelnieks et al. | |
| 6,647,269 B2 * | 11/2003 | Hendrey et al. | 455/456.3 |
| 6,763,334 B1 * | 7/2004 | Matsumoto et al. | 705/14.19 |
| 6,772,129 B2 * | 8/2004 | Alvarez et al. | 705/14.41 |
| 6,785,421 B1 * | 8/2004 | Gindele et al. | 382/217 |
| 6,963,848 B1 | 11/2005 | Brinkerhoff | |
| 7,007,074 B2 | 2/2006 | Radwin | |
| 7,031,932 B1 * | 4/2006 | Lipsky et al. | 705/14.41 |
| 7,130,808 B1 | 10/2006 | Ranka et al. | |
| 7,136,875 B2 | 11/2006 | Anderson et al. | |
| 7,370,002 B2 | 5/2008 | Heckerman et al. | |
| 7,383,258 B2 | 6/2008 | Harik et al. | |
| 7,406,434 B1 | 7/2008 | Chang et al. | |
| 7,415,423 B2 | 8/2008 | Ranka et al. | |
| 7,499,874 B2 | 3/2009 | Singh et al. | |
| 7,818,208 B1 | 10/2010 | Veach | |
| 7,827,060 B2 | 11/2010 | Wright et al. | |
| 8,229,788 B2 * | 7/2012 | Nyhan et al. | 705/14.41 |
| 2002/0103698 A1 | 8/2002 | Cantrell | |
| 2002/0147637 A1 | 10/2002 | Kraft et al. | |
| 2003/0023598 A1 | 1/2003 | Janakiraman et al. | |
| 2003/0032409 A1 | 2/2003 | Hutcheson et al. | |
| 2003/0046161 A1 | 3/2003 | Kamangar et al. | |
| 2003/0220866 A1 | 11/2003 | Pisaris-Henderson et al. | |
| 2004/0054577 A1 | 3/2004 | Inoue et al. | |
| 2004/0059708 A1 | 3/2004 | Dean et al. | |
| 2004/0059712 A1 | 3/2004 | Dean et al. | |
| 2004/0267723 A1 | 12/2004 | Bharat | |
| 2005/0021397 A1 | 1/2005 | Cui et al. | |
| 2005/0154717 A1 | 7/2005 | Watson et al. | |
| 2005/0251444 A1 | 11/2005 | Varian et al. | |
| 2006/0026071 A1 | 2/2006 | Radwin | |
| 2006/0173744 A1 | 8/2006 | Kandasamy et al. | |
| 2006/0288100 A1 | 12/2006 | Carson et al. | |
| 2007/0027756 A1 | 2/2007 | Collins et al. | |
| 2007/0067215 A1 | 3/2007 | Agarwal et al. | |
| 2007/0078707 A1 | 4/2007 | Axe et al. | |
| 2007/0156514 A1 | 7/2007 | Wright et al. | |
| 2007/0156621 A1 | 7/2007 | Wright et al. | |
| 2007/0156887 A1 | 7/2007 | Wright et al. | |
| 2008/0097834 A1 | 4/2008 | McElfresh et al. | |
| 2010/0082439 A9 | 4/2010 | PATEL et al. | |
| 2011/0264508 A1 * | 10/2011 | Harik et al. | 705/14.42 |

FOREIGN PATENT DOCUMENTS

| | | |
|---|---|---|
| JP | 2003-141410 A | 5/2003 |
| JP | 2005-190340 A | 7/2005 |
| JP | 2005-276206 A | 10/2005 |
| JP | 2007-524925 A | 8/2007 |
| KR | 2001-0109402 A | 12/2001 |
| KR | 2002-0038141 | 5/2002 |
| KR | 2002-0091101 | 12/2002 |
| WO | WO 01/09789 | 2/2001 |
| WO | WO 01/15053 A2 | 3/2001 |
| WO | WO 03/023680 A1 | 3/2003 |
| WO | WO 2004/111771 | 12/2004 |
| WO | WO 2005/006141 A2 | 1/2005 |
| WO | WO 2005/010702 A2 | 2/2005 |
| WO | WO 2005/033879 A2 | 4/2005 |
| WO | WO 2005/043344 A2 | 5/2005 |
| WO | WO 2005/052753 A2 | 6/2005 |
| WO | WO 2005/062863 A2 | 7/2005 |

OTHER PUBLICATIONS

Office Action from U.S. Appl. No. 12/876,726, dated Dec. 13, 2010, 11 pages.

Office Action from U.S. Appl. No. 11/321,046, dated Sep. 28, 2010, 23 pages.

Co-pending U.S. Appl. No. 11/321,064, filed Dec. 30, 2005 entitled "Using Estimated Ad Qualities for Ad Filtering, Ranking and Promotion" by Daniel Wright et al., 84 pages.

Yu et al., "Dynamic Web pages for location-based services," Jul. 17-19, 2002.

Office Action from U.S. Appl. No. 11/321,076, dated May 6, 2010, 17 pages.

Office Action from U.S. Appl. No. 11/167,581, dated Mar. 3, 2009, 16 pages.

Office Action from U.S. Appl. No. 11/321,046, dated Feb. 19, 2009, 23 pages.

Co-pending U.S. Appl. No. 11/167,581, filed Dec. 30, 2005 entitled "Accurately Estimating Advertisement Performance" by Eric Veech, 39 pages.

Co-pending U.S. Appl. No. 10/878,926, filed Jun. 28, 2004 entitled "Systems and Methods for Deriving and Using An Interaction Profile" by Alexis Jane Battle et al., 85 pages.

Office Action from U.S. Appl. No. 11/321,076, dated Feb. 18, 2009, 22 pages.

International Preliminary Report on Patentability dated Jul. 10, 2008, issued in International Application No. PCT/US2006/062673 (corresponding U.S. Appl. No. 11/321,064), 8 pages.

International Preliminary Report on Patentability dated Jul. 10, 2008, issued in International Application No. PCT/US2006/062710 (corresponding U.S. Appl. No. 11/321,046), 8 pages.

S. Brin et al., "The Anatomy of a Large-Scale Hypertextual Search Engine," 7th International World Wide Web Conference, 1998, 20 pages.

M. Fang et al., "Computing Iceberg Queries Efficiently," Proceedings of the 24th Very Large Data Bases Conference, 1998, 12 pages.

Shun-Zheng Yu et al., "Dynamic Web Pages for Location-Based Services", Jul. 17-19, 2002, 1 page.

Rotfeld et al., "Advertising and Product Quality : Are Heavily Advertised Products Better?", The Journal of Consumer Affairs (pre-1986); Summer 1976, pp. 33-47.

International Search Report and Written Opinion for PCT/US2006/062673, mailed Sep. 25, 2007, 10 pages.

* cited by examiner

| AD/QUERY FEATURE 1610 | TOTAL NUMBER OF AD SELECTIONS 1620 | TOTAL "GOOD" PREDICTIVE VALUE 1630 | TOTAL "BAD" PREDICTIVE VALUE 1640 | "GOOD" AD ODDS 1650 | "BAD" AD ODDS 1660 |
|---|---|---|---|---|---|
| AD/QUERY FEATURE 1 1610-1 | $\sum clicks$ | $\sum P(good\ ad\ |\ selection)$ | $\sum P(bad\ ad\ |\ selection)$ | ODDS(GOOD AD| AD/QUERY FEATURE 1) | ODDS(BAD AD| AD/QUERY FEATURE 1) |
| AD/QUERY FEATURE 2 1610-2 | $\sum clicks$ | $\sum P(good\ ad\ |\ selection)$ | $\sum P(bad\ ad\ |\ selection)$ | ODDS(GOOD AD| AD/QUERY FEATURE 2) | ODDS(BAD AD| AD/QUERY FEATURE 2) |
| AD/QUERY FEATURE 3 1610-3 | $\sum clicks$ | $\sum P(good\ ad\ |\ selection)$ | $\sum P(bad\ ad\ |\ selection)$ | ODDS(GOOD AD| AD/QUERY FEATURE 3) | ODDS(BAD AD| AD/QUERY FEATURE 3) |
| --- | --- | --- | --- | | |
| AD/QUERY FEATURE N 1610-N | $\sum clicks$ | $\sum P(good\ ad\ |\ selection)$ | $\sum P(bad\ ad\ |\ selection)$ | ODDS(GOOD AD| AD/QUERY FEATURE N) | ODDS(BAD AD| AD/QUERY FEATURE N) |

USING ESTIMATED AD QUALITIES FOR AD FILTERING, RANKING AND PROMOTION

RELATED APPLICATION

This application is a continuation of U.S. patent application Ser. No. 11/321,064 filed Dec. 30, 2005, which is incorporated herein by reference.

BACKGROUND

1. Field of the Invention

Implementations described herein relate generally to on-line advertisements and, more particularly, to using estimated ad qualities for filtering, ranking and promoting on-line advertisements.

2. Description of Related Art

On-line advertising systems host advertisements that may advertise various services and/or products. Such advertisements may be presented to users accessing documents hosted by the advertising system, or to users issuing search queries for searching a corpus of documents. An advertisement may include a "creative," which includes text, graphics and/or images associated with the advertised service and/or product. The advertisement may further include a link to an ad "landing document" which contains further details about the advertised service(s) and/or product(s). When a particular creative appears to be of interest to a user, the user may select (or click) the creative, and the associated link causes a user's web browser to visit the "landing document" associated with the creative and associated link. This selection of an advertising creative and associated link by a user is referred to hereinafter as a "click."

On-line advertising systems often track ad clicks for billing and other purposes. One non-billing purpose for tracking ad clicks is to attempt to ascertain advertisement quality. The click through rate (CTR) is a measure used to determine advertisement quality. CTR represents the fraction of times a given ad gets "clicked" on when a given advertisement is presented to users. The CTR of an advertisement, however, is an imperfect measure of advertisement quality since it focuses on the advertisement creative rather than the object of that advertisement, which is the landing document. A user needs to click on an advertisement in order to determine if an advertisement is good or bad and, therefore, the occurrence/non-occurrence of a click is insufficient to determine the quality of an advertisement. Some advertisements receive many clicks because they have a good creative, but the landing document is completely unsatisfying, or irrelevant, to the user. Other advertisements receive very few clicks (e.g., due to the advertisement creative being poor), but every click leads to a satisfied user. Existing determinations of CTR associated with on-line advertisements, thus, provide imperfect measures of advertisement quality.

Furthermore, in existing on-line advertising systems, the advertisements that are displayed to users, and the ordering of the advertisements displayed to the users, are based solely on an advertisement's CTR and the max "cost per click" (CPC) that an advertiser is willing to bid to have its advertisement shown. The CPC is the amount that an advertiser is willing to pay an advertisement publisher and is based on a number of selections (e.g., clicks) that a specific advertisement receives. To the extent that CTR is being used as a surrogate for advertisement quality, it is insufficient for the reasons already set forth. Existing mechanisms for determining which advertisements to display, and for ranking the advertisements, thus, use an imperfect measure of advertisement quality that may not provide the highest quality advertisements to users.

SUMMARY

According to one aspect, a method may include obtaining a first parameter associated with a quality of an advertisement among multiple advertisements, where the first quality parameter does not include a click through rate. The method may further include functionally combining the first quality parameter with at least one other parameter and using the functional combination to filter, rank or promote the advertisement among the plurality of advertisements.

According to another aspect, a method may include obtaining ratings associated with a first group of advertisements, where the ratings indicate a quality of the first group of advertisements. The method may further include observing multiple different user actions associated with user selection of advertisements of the first group of advertisements and deriving a statistical model using the observed user actions and the obtained ratings. The method may also include using the statistical model to estimate quality scores associated with a second group of advertisements and providing a subset of advertisements of the second group of advertisements to a user based on the estimated quality scores.

According to a further aspect, a method may include determining quality scores associated with a set of advertisements using a statistical model where the quality scores do not include a click through rate (CTR). The method may also include disabling a first subset of advertisements of the set of advertisements based on the determined quality scores and providing a second subset of the set of advertisements to a user, where the second subset of the set of advertisements comprises the first set of advertisements minus the first subset of advertisements.

According to an additional aspect, a method may include determining quality scores associated with a set of advertisements using a statistical model, where the quality scores do not include a click through rate (CTR). The method may further include ranking advertisements of the set of advertisements based on the determined quality scores to determine a ranked order.

According to another aspect, a method may include determining quality scores associated with a group of advertisements using a statistical model, where the quality scores do not include a click through rate (CTR). The method may further include promoting one or more advertisements of the group of advertisements based on the determined quality scores, positioning the promoted one or more advertisements of the group of advertisements in a prominent position on a document, and positioning unpromoted advertisements of the group of advertisements in a less prominent position on the document than the promoted one or more advertisements.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 16 is a diagram of an exemplary data structure for storing the predictive values determined in FIG. 14;

DETAILED DESCRIPTION

The following detailed description of the invention refers to the accompanying drawings. The same reference numbers in different drawings may identify the same or similar elements. Also, the following detailed description does not limit the invention.

Systems and methods consistent with aspects of the invention may use multiple observations of user behavior (e.g., real-time observations or observations from recorded user logs) associated with user selection of on-line advertisements to more accurately estimate advertisement quality as compared to conventional determinations based solely on CTR. Quality ratings associated with known rated advertisements, and corresponding measured observed user behavior associated with selections (e.g., "clicks") of those known rated advertisements, may be used to construct a statistical model. The statistical model may subsequently be used to estimate qualities associated with advertisements based on observed user behavior, and/or features of the selected ad or a query used to retrieve the ad, associated with selections of the advertisements. The estimated qualities associated with advertisements may be used for determining which advertisements to provide to users, for ranking the advertisements, and/or for promoting selected ones of the advertisements to a prominent position on a document provided to users.

A "document," as the term is used herein, is to be broadly interpreted to include any machine-readable and machine-storable work product. A document may include, for example, an e-mail, a web page or site, a business listing, a file, a combination of files, one or more files with embedded links to other files, a news group posting, a blog, an on-line advertisement, etc. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
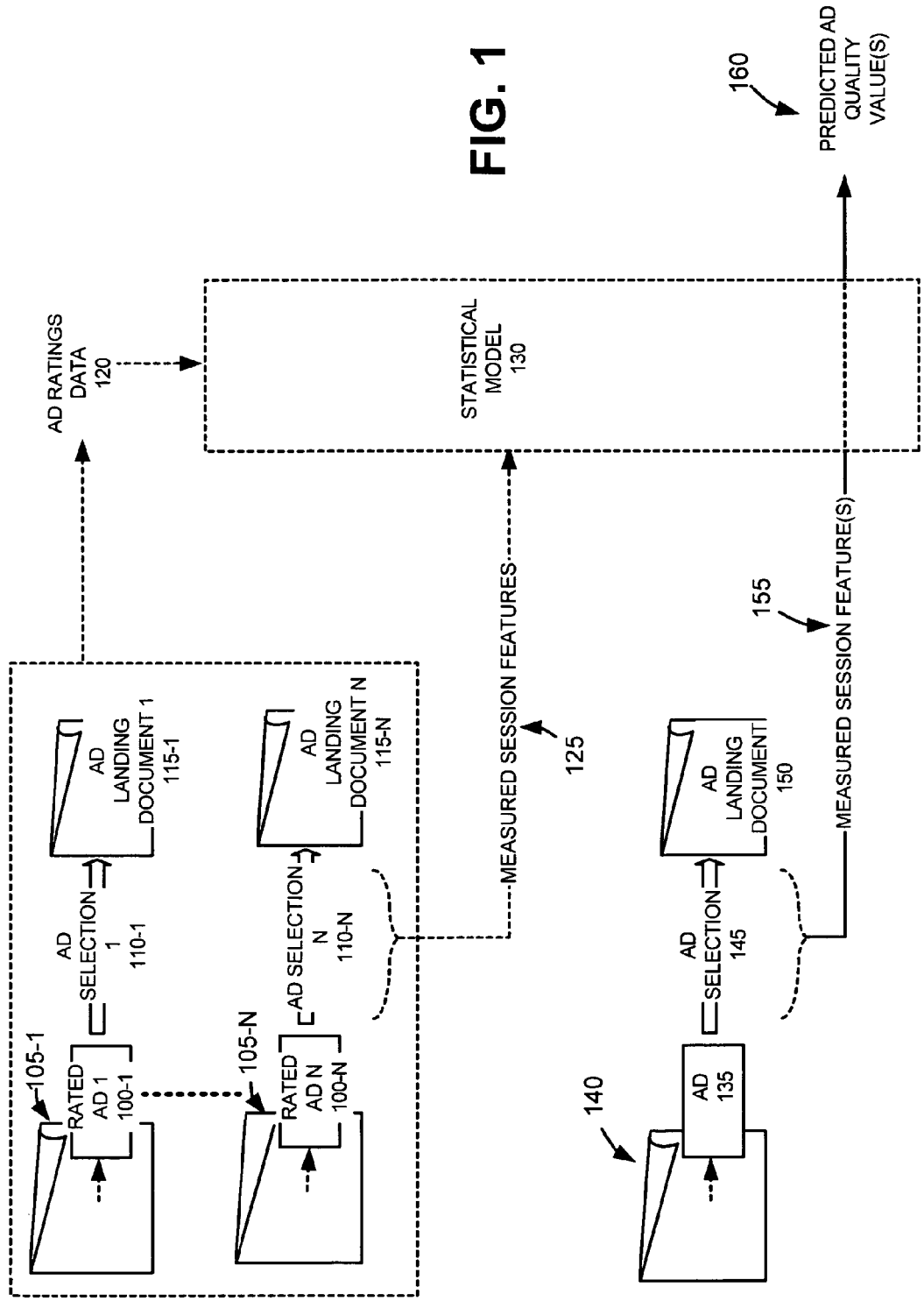
FIGS. 1 and 2 are exemplary diagrams of an overview of an implementation in which observed user behavior and known quality ratings associated with a set of advertisements are used to construct a statistical model that can be used for estimating advertisement quality, and advertisements can then be filtered, ranked or promoted based on the estimated advertisement quality.
Figure 2:
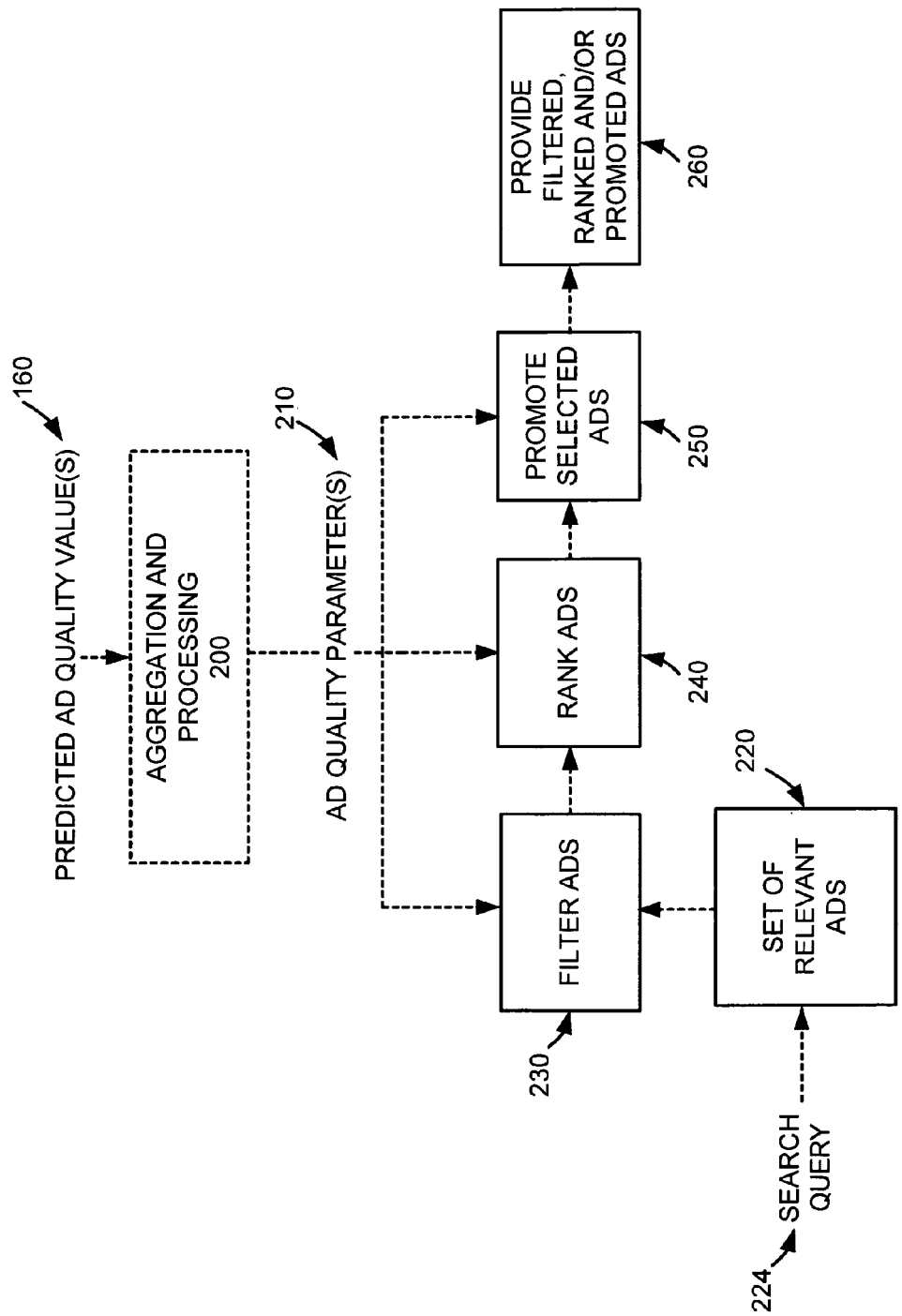

FIGS. 1 and 2 illustrate an exemplary overview of an implementation of the invention in which observed user behavior may be used to estimate qualities of on-line advertisements and then the estimated qualities may be used in filtering, ranking and/or promoting selected advertisements.

As shown in FIG. 1, each one of multiple rated advertisements 100-1 through 100-N (collectively referred to herein as ad 100) may be associated with a corresponding document 105-1 through 105-N (collectively referred to herein as document 105). Each document 105 may include a set of search results resulting from a search executed by a search engine based on a search query provided by a user and may further include one or more advertisements in addition to a rated ad 100. Each advertisement 100 may be associated with ratings data 120 provided by human raters who have rated a quality of each rated advertisement 100. Each advertisement 100 may advertise various products or services.

In response to receipt of an advertisement 100, the receiving user may, based on the "creative" displayed on the advertisement, select 110 the advertisement (e.g., "click" on the displayed advertisement using, for example, a mouse). After ad selection 110, an ad landing document 115 may be provided to the selecting user by a server hosting the advertisement using a link embedded in ad 100. The ad landing document 115 may provide details of the product(s) and/or service(s) advertised in the corresponding advertisement 100.

Before, during and/or after each ad selection 110 by a user, session features 125 associated with each ad selection 110 during a "session" may be measured in real-time or logged in memory or on disk. A session may include a grouping of user actions that occur without a break of longer than a specified period of time (e.g., a group of user actions that occur without a break of longer than three hours).

The measured session features 125 can include any type of observed user behavior or actions. For example, session features 125 may include a duration of the ad selection 110 (e.g., a duration of the "click" upon the ad 100), the number of selections of other advertisements before and/or after a given ad selection, the number of selections of search results before and/or after a given ad selection, the number of selections on other types of results (e.g., images, news, products, etc.) before and/or after a given ad selection, a number of document views (e.g., page views) before and/or after a given ad selection (e.g., page views of search results before and/or after the ad selection), the number of search queries before and/or after a given ad selection, the number of queries associated with a user session that show advertisements, the number of repeat selections on a same given advertisement, or an indication of whether a given ad selection was the last selection in a session, the last ad selection in a session, the last selection for a given search query, or the last ad selection for a given search query. Other types of observed user behavior associated with ad selection, not described above, may be used consistent with aspects of the invention.

Using the measured session features 125 and ad ratings data 120, associated with each ad selection 110 of a corresponding rated advertisement 100, a statistical model 130 may be constructed (as further described below). The statistical model may include a probability model derived using statistical techniques. Such techniques may include, for example, logistic regression, regression trees, boosted stumps, or any other statistical modeling technique. Statistical model 130 may provide a predictive value that estimates the likelihood that a given advertisement is good given measured session features associated with a user selection of the advertisement (e.g., P(good ad|ad selection)=$f_g$(session features)).

Subsequent to construction of statistical model 130, ad quality values of advertisements selected by one or more users may be predicted. An ad 135, associated with a document 140 and hosted by a server in a network, may be provided to an accessing user. Session features 155 associated with user selection 145 of ad 135 may be measured or logged in memory or on disk, and the measurements may be provided as inputs into statistical model 130. Statistical model 130 may determine a likelihood that ad 135 is a good ad, given the measured session features, and may predict an ad quality value(s) 160 for ad 135. Though FIG. 1 depicts the prediction of a quality value associated with a single ad 135, ad quality values 160 may estimated for each ad 135 selected by multiple users to produce multiple predicted ad quality values 160.

As shown in FIG. 2, the predicted quality values 160 resulting from multiple ad selections may be aggregated and processed 200 (as described below with respect to FIGS. 14-20) to further provide ad quality parameters 210 that indicate that each respective advertisement is a good advertisement or a bad advertisement. The ad quality parameters 210 may be used to filter, rank and/or promote selected ones of the ads associated with the ad quality parameters 210. A set of ads 220 may first be determined that are relevant to a search query 224 issued by a user. An advertisement may be determined to be relevant to search query 224, for example, based on a comparison of the content of the advertisement with the terms of search query 224. The set of ads 220 may then be filtered 230 based on the ad quality parameter(s) 210, alone or in combination with CTR, associated with each of the ads. Filtering the set of ads 220 may disable selected ones of the advertisements such that they are not provided to the user that issued search query 224. Various techniques, that use the estimated advertisement qualities, may be used for filtering selected ads of the set of relevant ads 210 as further described below.

The set of relevant ads 220 may then be ranked 240 based on the ad quality parameter(s) 210. The set of relevant ads 220 may be ranked 240 subsequent (or prior) to filtering 230, or without filtering 230 being performed. Ranking 240 the set of relevant ads 220 determines a selected order for providing each of the relevant ads 220 to the user that issued the search query 224.

One or more ads of the set of relevant ads 220 may further be promoted 250 based on the ad quality parameter(s) 210. Promotion of an advertisement may include positioning the promoted ad at a different location on a document relative to unpromoted ads. For example, promoted ads may be placed in a highlighted (more prominent) position on a document (e.g., at a top of a document or a bottom of the document), whereas unpromoted ads may be placed in a different, non-highlighted or less prominent position on the document. The set of relevant ads 220 may be promoted 250 subsequent to filtering 230 and ranking 240, subsequent only to ranking 240, or without filtering 230 or ranking 240 being performed.

The filtered, ranked and/or promoted ads may be provided to the user that issued the search query 224. In some implementations, the filtered, ranked and/or promoted ads may be included in one or more documents provided to the user that include search results resulting from the execution of the user's issued search query 224 by a search engine.

Exemplary Network Configuration

Figure 3:
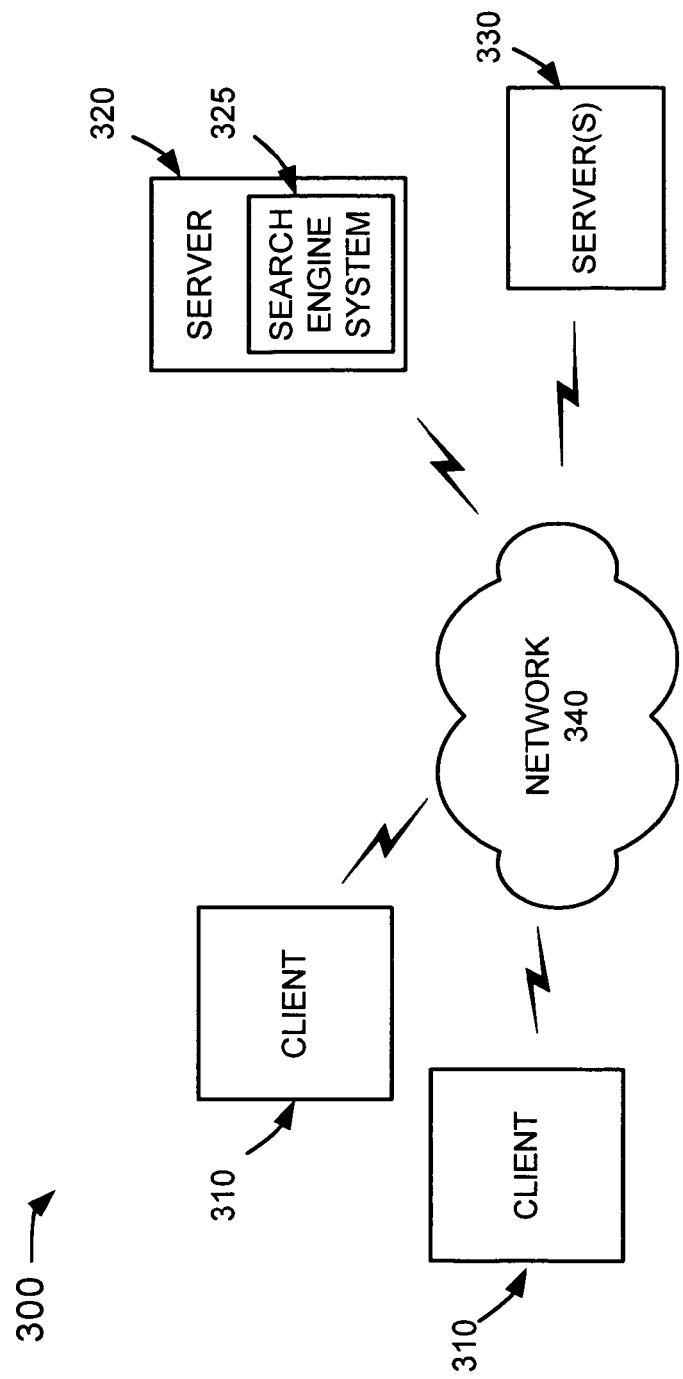
FIG. 3 is an exemplary diagram of a network in which systems and methods consistent with the principles of the invention may be implemented.

FIG. 3 is an exemplary diagram of a network 300 in which systems and methods consistent with the principles of the invention may be implemented. Network 300 may include multiple clients 310 connected to one or more servers 320-330 via a network 340. Two clients 310 and two servers 320-330 have been illustrated as connected to network 340 for simplicity. In practice, there may be more or fewer clients and servers. Also, in some instances, a client may perform a function of a server and a server may perform a function of a client.

Clients 310 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. One or more users may be associated with each client 310. Servers 320 and 330 may include server entities that access, fetch, aggregate, process, search, and/or maintain documents in a manner consistent with the principles of the invention. Clients 310 and servers 320 and 330 may connect to network 340 via wired, wireless, and/or optical connections.

In an implementation consistent with the principles of the invention, server 320 may include a search engine system 325 usable by users at clients 310. Server 320 may implement a data aggregation service by crawling a corpus of documents (e.g., web documents), indexing the documents, and storing information associated with the documents in a repository of documents. The data aggregation service may be implemented in other ways, such as by agreement with the operator(s) of data server(s) 330 to distribute their hosted documents via the data aggregation service. In some implementations, server 320 may host advertisements (e.g., creatives, ad landing documents) that can be provided to users at clients 310. Search engine system 325 may execute a query, received from a user at a client 310, on the corpus of documents stored in the repository of documents, and may provide a set of search results to the user that are relevant to the executed query. In addition to the set of search results, server 320 may provide one or more advertising creatives, associated with results of the executed search, to the user at client 310.

Server(s) 330 may store or maintain documents that may be crawled by server 320. Such documents may include data related to published news stories, products, images, user groups, geographic areas, or any other type of data. For example, server(s) 330 may store or maintain news stories from any type of news source, such as, for example, the Washington Post, the New York Times, Time magazine, or Newsweek. As another example, server(s) 330 may store or maintain data related to specific products, such as product data provided by one or more product manufacturers. As yet another example, server(s) 330 may store or maintain data related to other types of web documents, such as pages of web sites. Server(s) 330 may further host advertisements, such as ad creatives and ad landing documents.

Network 340 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

While servers 320-330 are shown as separate entities, it may be possible for one of servers 320-330 to perform one or more of the functions of the other one of servers 320-330. For example, it may be possible that servers 320 and 330 are implemented as a single server. It may also be possible for a single one of servers 320 and 330 to be implemented as two or more separate (and possibly distributed) devices.

Exemplary Client/Server Architecture

Figure 4:
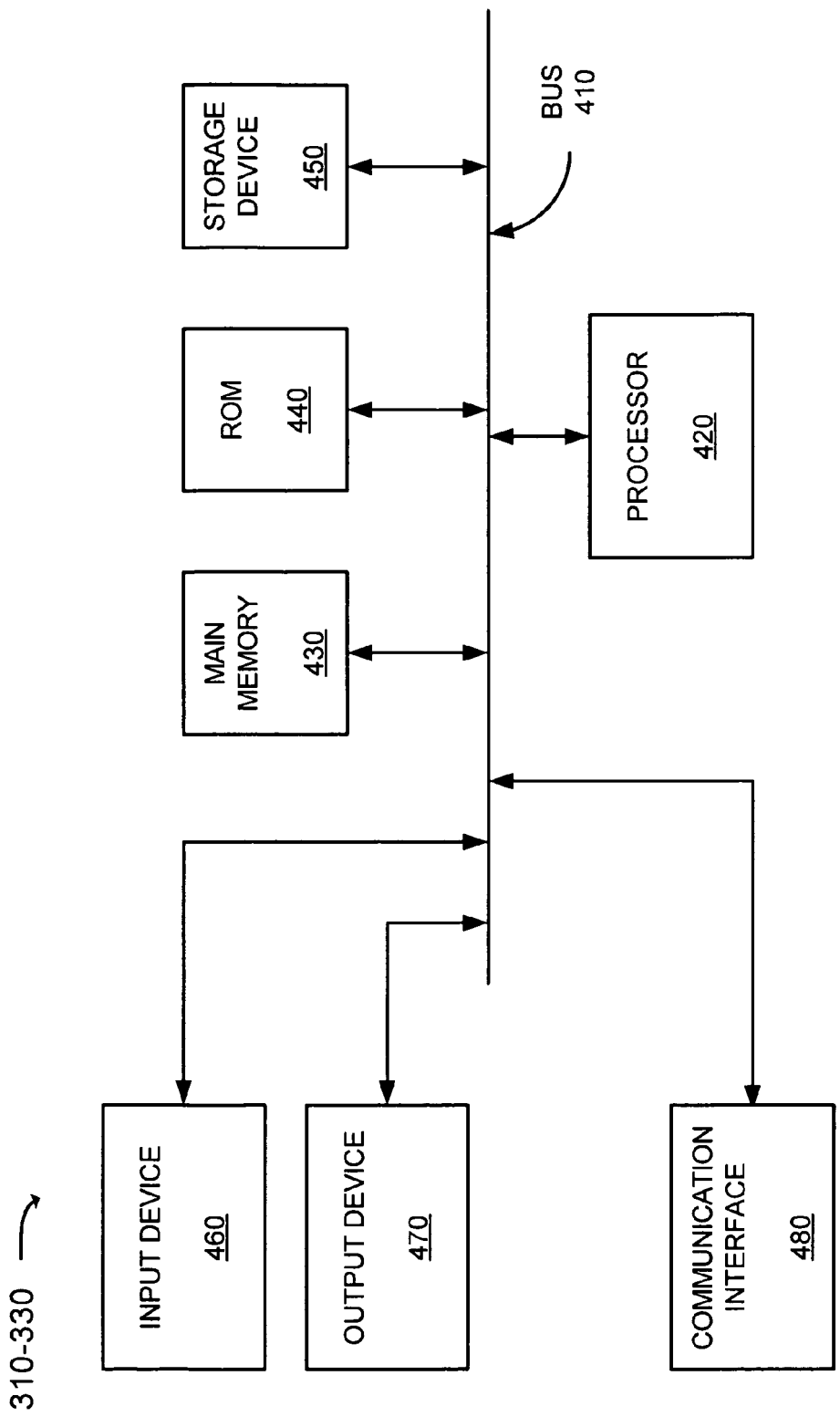
FIG. 4 is an exemplary diagram of a client or server of FIG. 3 according to an implementation consistent with the principles of the invention.

FIG. 4 is an exemplary diagram of a client or server entity (hereinafter called "client/server entity"), which may correspond to one or more of clients 310 and/or servers 320-330, according to an implementation consistent with the principles of the invention. The client/server entity may include a bus 410, a processor 420, a main memory 430, a read only memory (ROM) 440, a storage device 450, an input device 460, an output device 470, and a communication interface 480. Bus 410 may include a path that permits communication among the elements of the client/server entity.

Processor 420 may include a processor, microprocessor, or processing logic that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 450 may include a magnetic and/or optical recording medium and its corresponding drive.

Input device 460 may include a mechanism that permits an operator to input information to the client/server entity, such as a keyboard, a mouse, a pen, voice recognition and/or biometric mechanisms, etc. Output device 470 may include a mechanism that outputs information to the operator, including a display, a printer, a speaker, etc. Communication interface 480 may include any transceiver-like mechanism that enables the client/server entity to communicate with other devices and/or systems. For example, communication interface 480 may include mechanisms for communicating with another device or system via a network, such as network 340.

The client/server entity, consistent with the principles of the invention, may perform certain operations or processes, as will be described in detail below. The client/server entity may perform these operations in response to processor 420 executing software instructions contained in a computer-readable medium, such as memory 430. A computer-readable medium may be defined as a physical or logical memory device and/or carrier wave.

The software instructions may be read into memory 430 from another computer-readable medium, such as data storage device 450, or from another device via communication interface 480. The software instructions contained in memory 430 may cause processor 420 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 5:
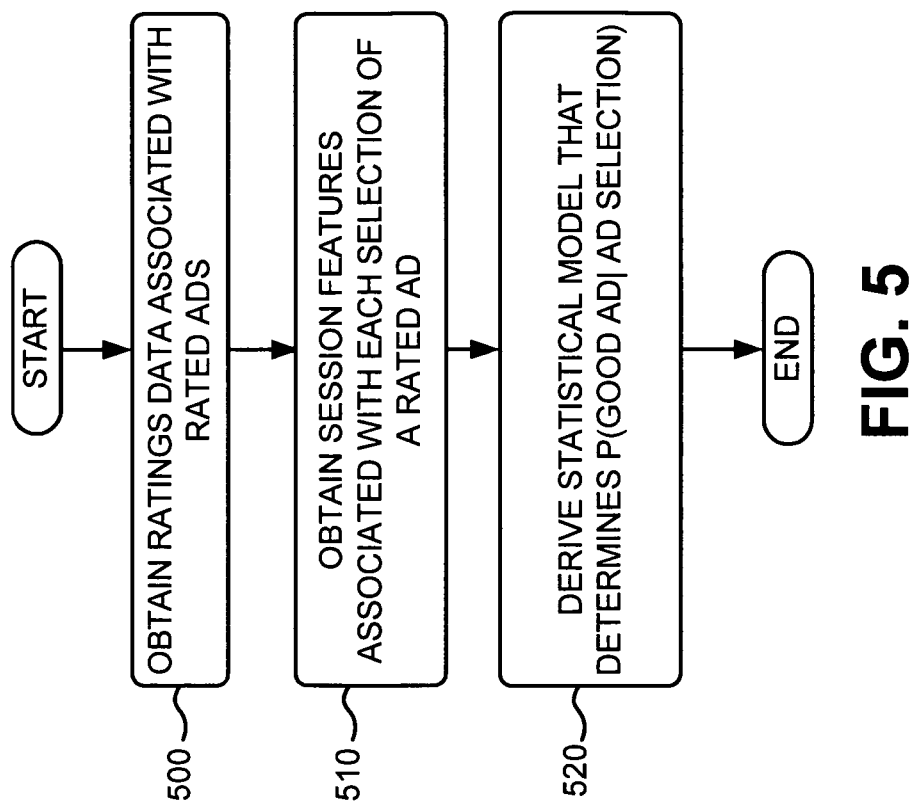
FIG. 5 is a flowchart of an exemplary process for constructing a model of user behavior associated with the selections of multiple on-line advertisements according to an implementation consistent with the principles of the invention.

Exemplary Process for Construction a Statistical Model of User Behavior Associated with Ad Selections FIG. 5 is a flowchart of an exemplary process for constructing a statistical model of user behavior associated with the selections of multiple on-line advertisements. As one skilled in the art will appreciate, the process exemplified by FIG. 5 can be implemented in software and stored on a computer-readable memory, such as main memory 430, ROM 440, or storage device 450 of server 320, server 330 or a client 310, as appropriate.

The exemplary process may begin with obtaining ratings data associated with rated advertisements (block 500). The ratings data may include human generated data that rates the quality of each of the rated ads (e.g., one way of rating an ad is to rate how relevant is the ad relative to the query issued). Session features associated with each selection of a rated advertisement may then be obtained (block 510). The session features may be obtained in real-time by observing actual user behavior during a given user session, that occurred before, during and after the presentation of each ad impression to a user, or may be obtained from recorded logs of session features (i.e., user behavior and actions) that were stored in a data structure before, during and/or after the presentation of each ad impression to a user. The obtained session features 125 can include any type of observed user behavior. Each of the session features 125 may correspond to an indirect measurement of user satisfaction with a given advertisement. Certain ones of the session features 125 may be factors in determining how different users have different values for other ones of the session features 125 (e.g., users with dial-up connections may have longer ad selection durations than users who have high speed Internet connections).

Session features 125 may include, but are not limited to, a duration of an ad selection (e.g., a duration of the "click" upon the advertisement), a number of selections of other advertisements before and/or after a given ad selection, a number of selections of search results before and/or after a given ad selection, a number of selections of other results before and/or after a given ad selection, a number of document views (e.g., page views) before and/or after a given ad selection, a number of search queries before and/or after a given ad selection, a number of search queries associated with a user session that show advertisements, a number of repeat selections on a same given advertisement, or an indication of whether a given ad selection was the last selection in a session, the last ad selection in a session, a last selection for a given search query, or the last ad selection for a given search query. FIGS. 6-13 below depict various exemplary types of user behavior, consistent with aspects of the invention, that may be measured as session features.

Figure 6:
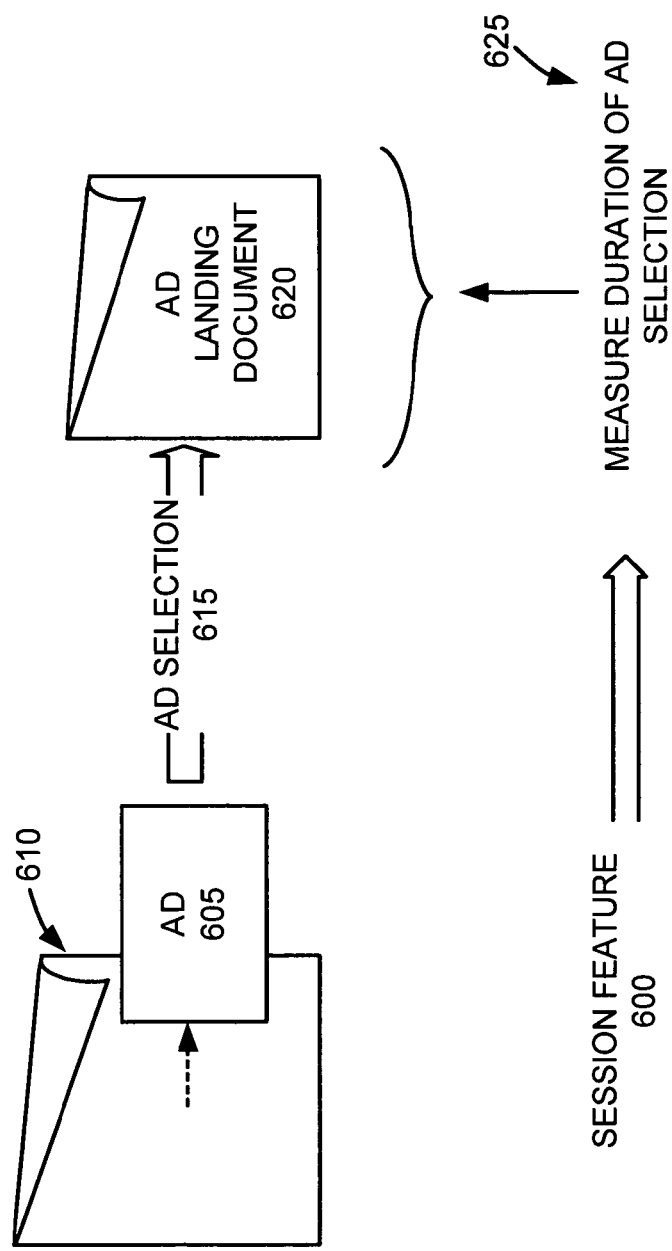
FIGS. 6-13 illustrate various exemplary session features, corresponding to observed or logged user actions, that may be used for constructing a statistical model for predicting advertisement quality.

FIG. 6 illustrates the measurement of a duration of an ad selection as a session feature 600. As shown in FIG. 6, an ad 605, that is associated with a document 610, may be provided to a user. In response to receipt of ad 605, the user may select 615 ad 605, and an ad landing document 620 may be provided to the user. A duration 625 of the ad selection (e.g., the period of time from selection of the advertisement until the user's next action, such as clicking on another ad, entering a new query, etc.) may be measured as a session feature 600.

Figure 7:
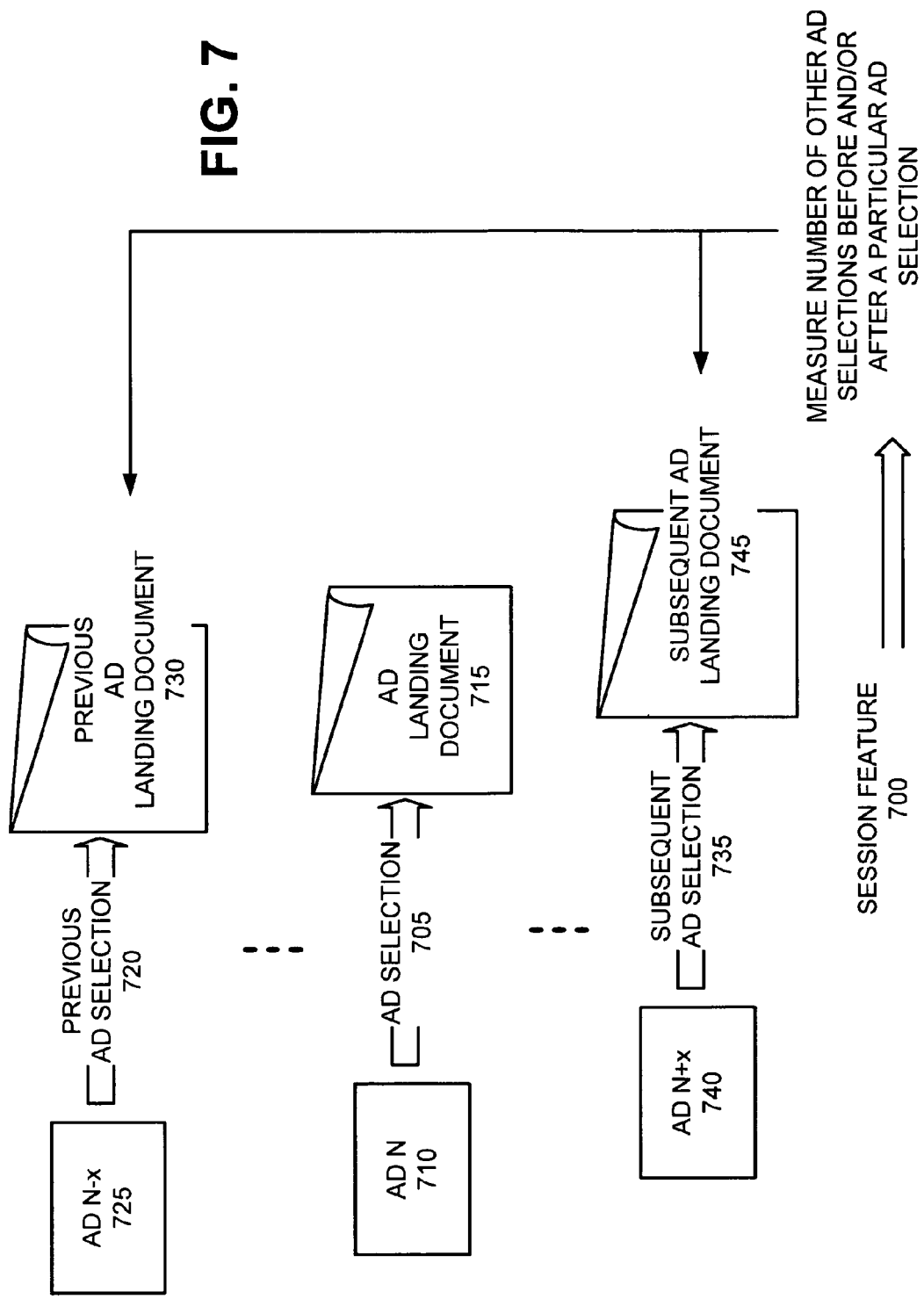

FIG. 7 illustrates the measurement of a number of other ad selections before and/or after a particular ad selection as a session feature 700. Given a particular selection 705 of an ad N 710, and provision of an ad landing document 715 in response to the ad selection 705, a number of one or more previous ad selections 720 of ads N−x 725, corresponding to provisions of previous ad landing documents 730, may be measured. Additionally, or alternatively, given a particular selection 705 of an ad N 710, a number of one or more subsequent ad selections 735 of ads N+x 740, corresponding to provisions of subsequent ad landing documents 745, may be measured. The number of other ad selections before and/or after a particular ad selection may be measured as a session feature 700.

Figure 8:
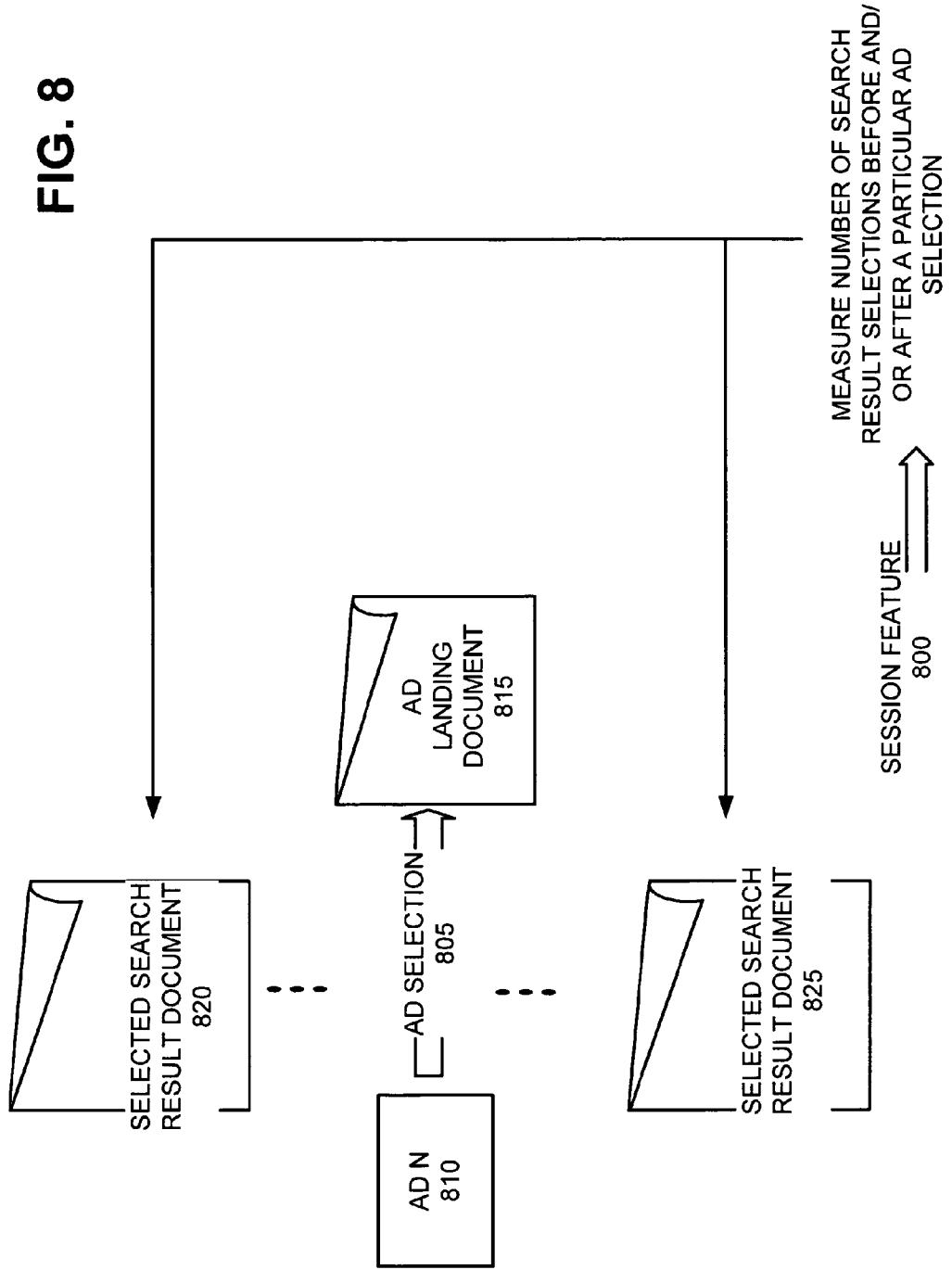

FIG. 8 illustrates the measurement of a number of search result selections before and/or after a particular ad selection as a session feature 800. Given a particular selection 805 of an ad N 810, and provision of an ad landing document 815 in response to the ad selection 805, a number of search result documents 820 viewed by the user before the ad selection 805 may be measured as a session feature 800. The search result documents may be provided to the user based on the execution of a search using a search query issued by the user. Additionally, or alternatively, a number of search result documents 825 viewed by the user after the ad selection 805 may be measured as a session feature 800.

Figure 9:
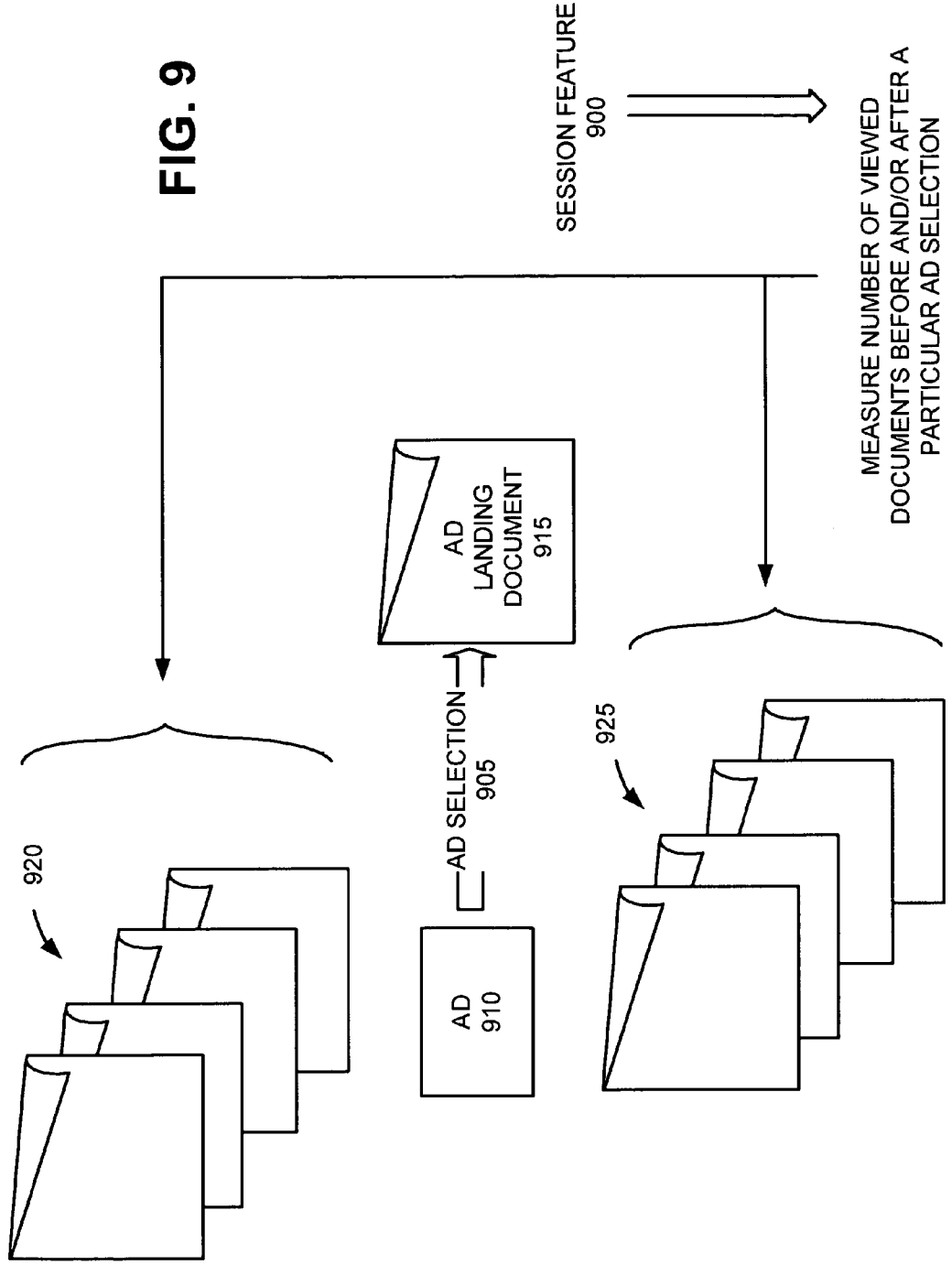

FIG. 9 illustrates the measurement of a number of documents viewed by a user before and/or after a particular ad selection as a session feature 900. Given a particular selection 905 of an ad 910, and provision of an ad landing document 915 in response to the ad selection 905, a number of documents 920 viewed by a user (e.g., page views) before the ad selection 905 may be measured as a session feature 900. Additionally, or alternatively, a number of documents 925 viewed by a user (e.g., page views) after the ad selection 905 may be measured as a session feature 900.

Figure 10:
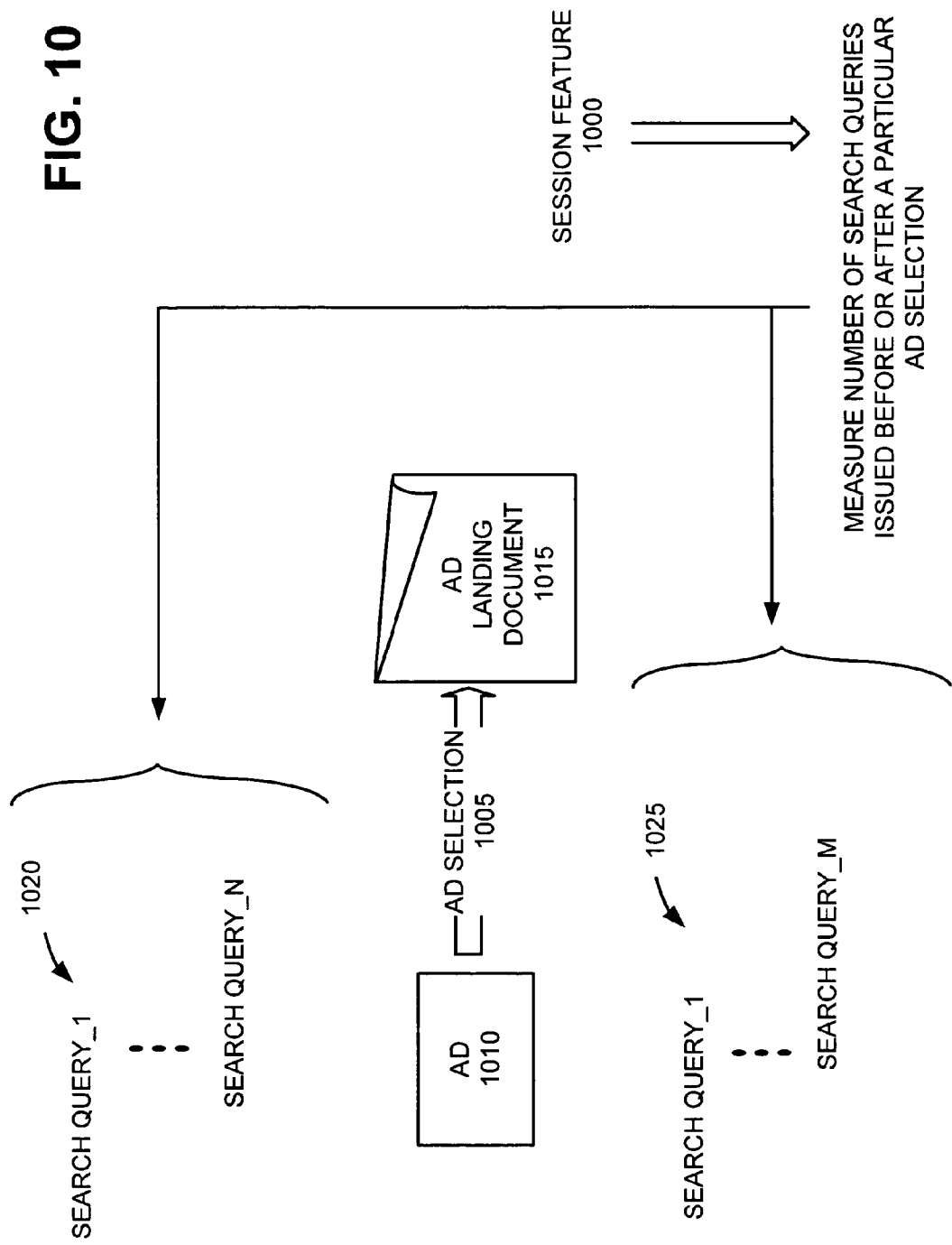

FIG. 10 illustrates the measurement of a number of search queries issued by a user before and/or after a particular ad selection as a session feature 1000. Given a particular selection 1005 of an ad 1010, and provision of an ad landing document 1015 in response to the ad selection 1005, a number of search queries 1020 issued by a user before the ad selection 1005 may be measured as a session feature 1000. Additionally, or alternatively, a number of search queries 1025 issued by a user after the ad selection 1005 may be measured as a session feature 1000.

Figure 11:
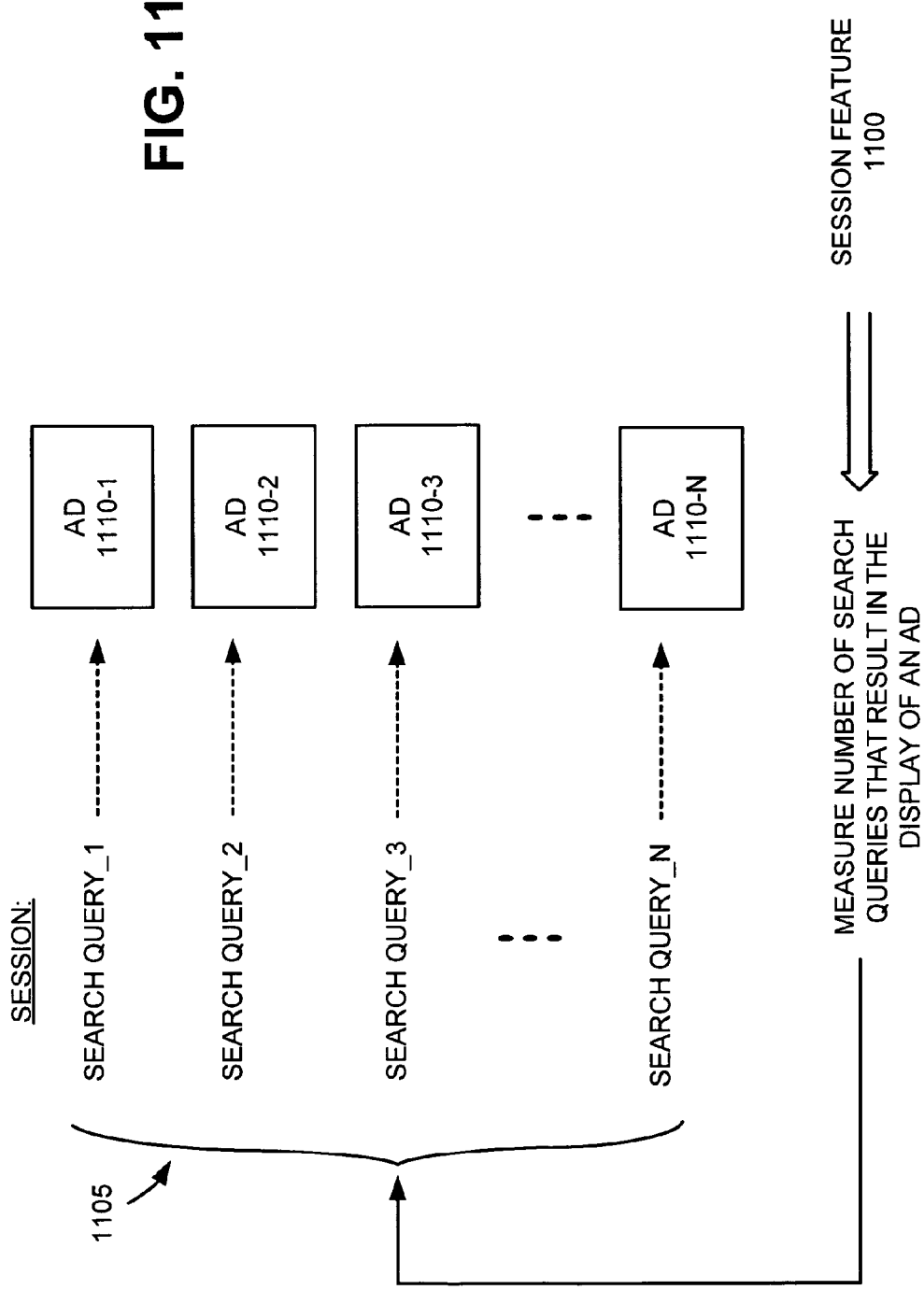

FIG. 11 illustrates the measurement of a number of search queries, in a session that includes a particular ad selection, that results in the display of an advertisement as a session feature 1100. Given a session that includes a particular ad selection, a number of search queries 1105 may be measured that result in the display of a corresponding ad 1110-1 through 1110-N. The number of search queries may be measured as a session feature 1100. The number of search queries 1105 resulting in the display of an advertisement may indicate the commercial nature of a given user session.

Figure 12:
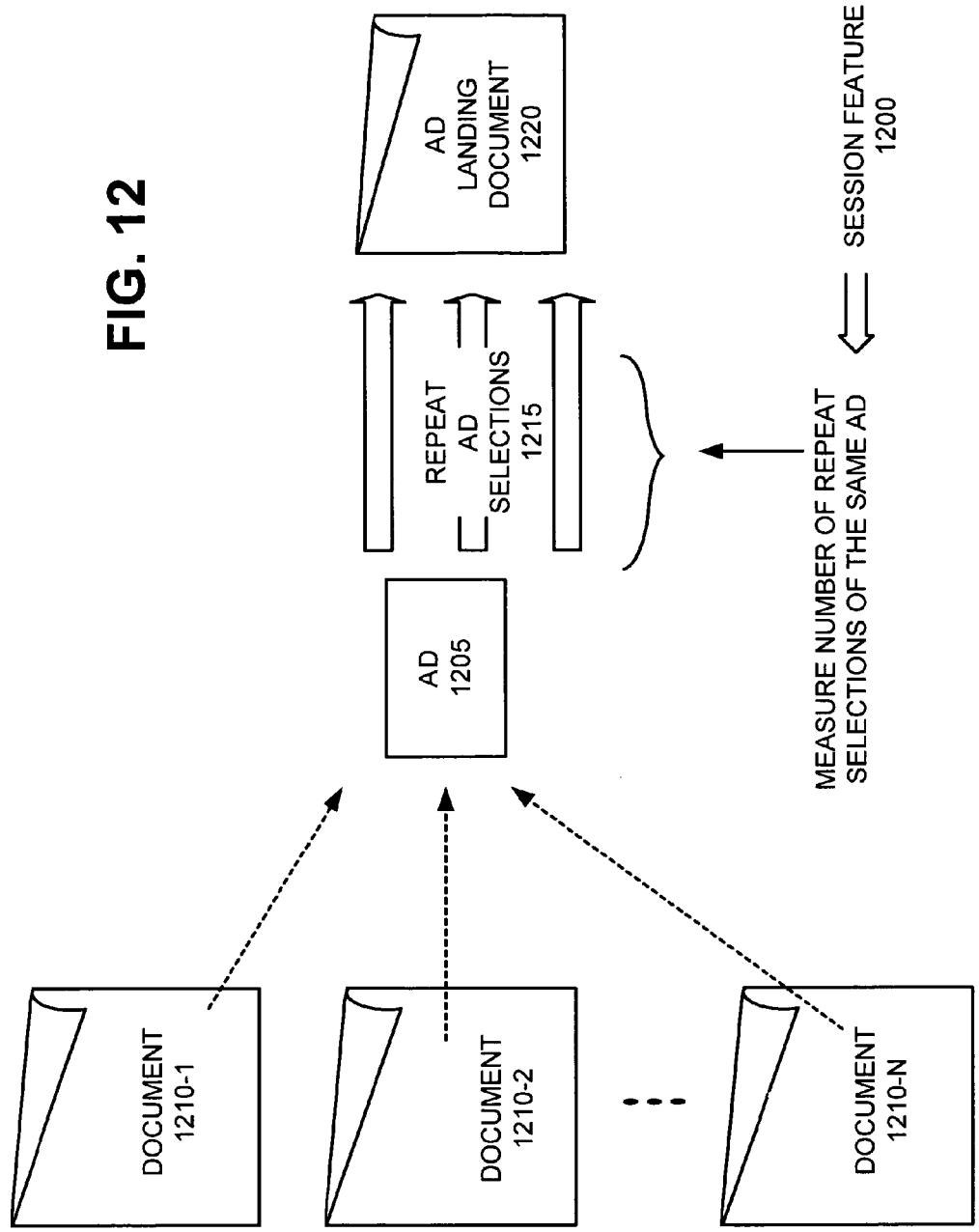

FIG. 12 illustrates the measurement of a number of repeat selections of the same advertisement by a user as a session feature 1200. As shown in FIG. 12, an ad 1205, that may be associated with multiple documents 1210-1 through 1210-N, may be provided to a user one or more times. In response to each receipt of the ad 1205, the user may select 1215 ad 1205, and an ad landing document 1220 may be provided to the user for each of the repeated user selections. The number of repeat selections of the same advertisement by the user may be measured as a session feature 1200.

Figure 13:
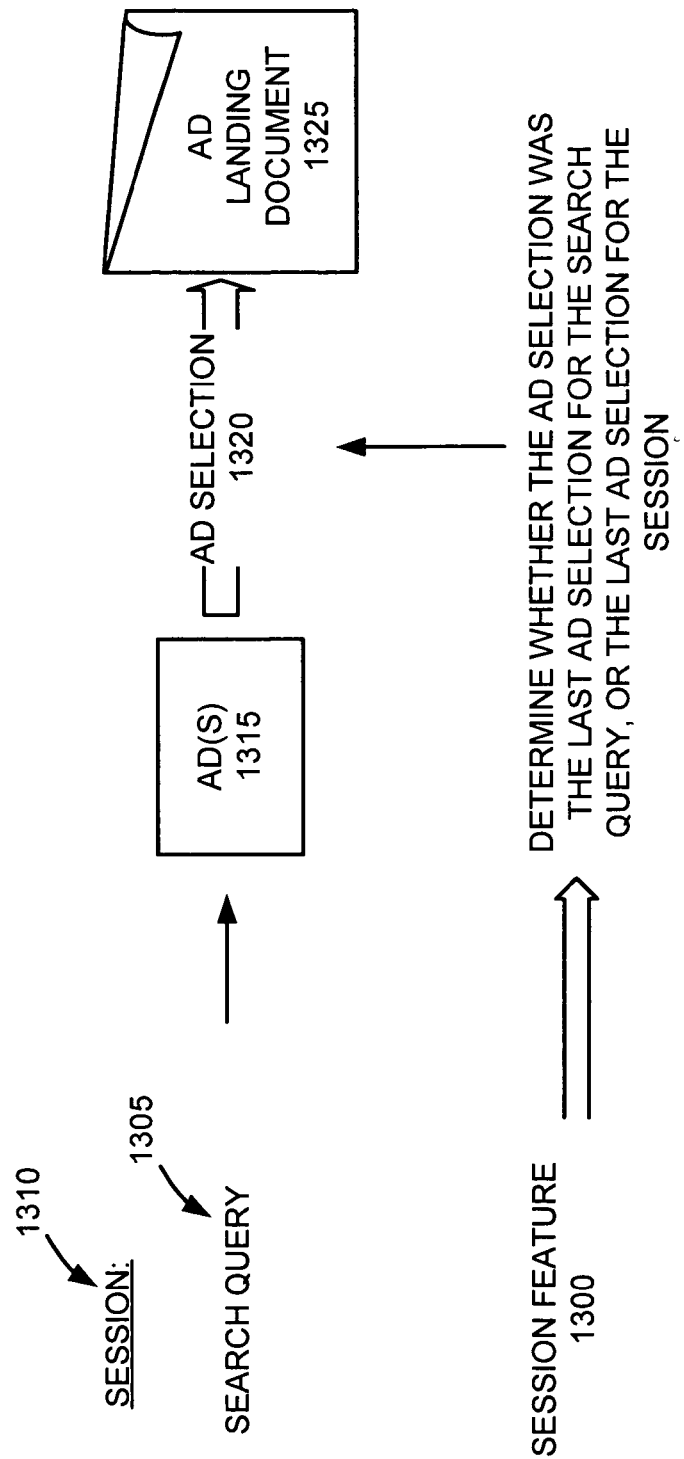

FIG. 13 illustrates the determination of whether an ad selection is the last ad selection for a given search query, or whether the ad selection is the last ad selection for a user session as a session feature 1300. As shown in FIG. 13, a user may issue a search query 1305 during a given session 1310, and one or more ads 1315 may be provided to the user subsequent to issuance of search query 1305. In response to each receipt of the ad(s) 1315, the user may select 1320 ad 1315, and an ad landing document 1325 may be provided to the user. A determination may be made whether the ad selection 1320 is the last ad selection for search query 1305. Thus, if multiple ads were selected by the user that issued search query 1305, then only the last ad selection for search query 1305 may be identified. A determination may also be made whether the ad selection 1320 was the last ad selection for session 1310. Therefore, if multiple ad selections have been made by the user during a given session, then only the last ad selection for the session may be identified.

Other types of user behavior, not shown in FIGS. 6-13, may be used as session features consistent with principles of the invention. The following lists numerous examples of other exemplary session features:

1) instead of an ad selection duration, a ratio of a given ad selection duration relative to an average ad selection duration for a given user may be used as a session feature.
2) a ratio of a given ad selection duration relative to all selections (e.g., search result selections or ad selections);
3) how many times a user selects a given ad in a given session.
4) a duration of time, from an ad result selection, until the user issues another search query. This may include time spent on other pages (reached via a search result click or ad click) subsequent to a given ad click.
5) a ratio of the time, from a given ad result selection until the user issues another search query, as compared to all other times from ad result selections until the user issued another search query.
6) time spent, given an ad result selection, on viewing other results for the search query, but not on the given ad result.
7) a ratio of the time spent in 6) above (i.e., the time spent on other results rather than the click duration) to an average of the time spent in 6) across all queries.
8) how many searches (i.e., a unique issued search query) that occur in a given session prior to a given search result or ad selection;
9) how many searches that occur in a given session after a given search result or ad selection.
10) rather than searches, how many result page views that occur for a given search query before a given selection. This can be computed within the query (i.e., just for a unique query), or for the entire session;
11) rather than searches, how many search result page views that occur for a given search query after this selection. This can be computed within the query (i.e., just for the unique query), or for the entire session;
12) the total number of page views that occur in the session;
13) the number of page views in the session that show ads;

14) the ratio of the number of page views in the session that show ads to the total number of page views that occur in the session;
15) total number of ad impressions shown in the session;
16) average number of ads shown per query that shows ads, another measure of the commerciality of the session;
17) query scan time—how long from when the user sees the results of a query to when the user does something else (click on an ad, search result, next page, new query, etc.);
18) ratio between a given query scan time and all other query scan times;
19) total number of selections (e.g., clicks) that occurred on a given search. These selections include all types of selections (e.g., search, onebox, ads) rather than just ad selections;
20) total number of selections that occurred on a search before a given ad selection;
21) total number of selections that occurred on a search after a given ad selection;
22) total number of ad selections that occurred on a search. May need to be normalized by the number of ads on the page;
23) total number of ad selections that occurred on a search before a given ad selection;
24) total number of ad selections that occurred on a search after a given ad selection;
25) total number of ad selections, that occurred on a search, whose ad positions on a document were located above a position of a given ad on the document;
26) total number of ad selections, that occurred on a search, whose ad positions on a document were located below a position of a given ad on the document;
27) total number of ad selections that occurred on a search that are not on a given ad;
28) total number of search result selections that occurred on a search;
29) total number of search selections that occurred on a search before a given ad selection;
30) total number of search result selections that occurred on a search after a given ad selection;
31) total number of search result selections of a long duration that occurred in the session;
32) total number of search result selections of a short duration that occurred in the session;
33) total number of search result selections that are last that occurred in the session. A given user may end a session by clicking on a search result, with no subsequent actions, or the user may end a session in some other fashion (e.g., ad result click, issuing a query and not clicking, etc.);
34) total number of non-search result and non-ad selections that occurred on a search;
35) an indication of whether there was a conversion from this ad selection;
36) an indication of the connection speed of the user (e.g., dialup, cable, DSL);
37) an indication of what country the user is located in. Different cultures might lead to users reacting differently to the same ad or having different cultural reactions or staying on sites differently;
38) an indication of what region of the world (e.g., APAC=asia pacific) that the user is located in;
39) was the keyword for a given ad an exact match to the search query (i.e., has all of the same terms as the query) or is missing one word, more than one word, or has rewrite terms. Often, the quality of an ad can vary (the more exact the match, the higher the quality) and keyword matching can be a reasonable way to segment ads, and predict whether an ad is good or bad separately for different match types.
40) an indication of an estimated click through rate (CTR) for a given ad;
41) what cost per click (CPC) did the advertiser pay for a given ad selection? The likelihood that an ad is good may depend on how much the advertiser paid (more is higher quality);
42) what CPC was the advertiser willing to pay? In ad auctioning, advertiser bidding may be used to set ad ranking and the ad/advertiser ranked lower than a given ad/advertiser sets the price that is actually paid by the next higher ranked ad/advertiser;
43) effective CPC * predicted CTR; or
44) bid CPC * predicted CTR.

The above describes numerous examples of session features that may be used for the statistical model. However, one skilled in the art will recognize that other session features may be used, alternatively, or in conjunction with any of the above-described session features.

Returning to FIG. 5, a statistical model may then be derived that determines the probability that each selected ad is a good quality ad given the measured session features associated with the ad selection (block 520). An existing statistical technique, such as, for example, logistic regression may be used to derive the statistical model consistent with principles of the invention. Regression involves finding a function that relates an outcome variable (dependent variable y) to one or more predictors (independent variables $x_1$, $x_2$, etc.). Simple linear regression assumes a function of the form:

$$y = c_0 + c_1 * x_1 + c_2 * x_2 + \qquad \text{Eqn. (1)}$$

and finds the values of $c_0$, $c_1$, $c_2$, etc. ($c_0$ is called the "intercept" or "constant term"). In the context of the present invention, each predictor variable $x_1$, $x_2$, $x_3$, etc. corresponds to a different session feature measured during ad selection. Logistic regression is a variation of ordinary regression, useful when the observed outcome is restricted to two values, which usually represent the occurrence or non-occurrence of some outcome event, (usually coded as 1 or 0, respectively), such as a good advertisement or a bad advertisement in the context of the present invention.

Logistic regression produces a formula that predicts the probability of the occurrence as a function of the independent predictor variables. Logistic regression fits a special s-shaped curve by taking the linear regression (Eqn. (1) above), which could produce any y-value between minus infinity and plus infinity, and transforming it with the function:

$$P = \exp(y) / (1 + \exp(y)) \qquad \text{Eqn. (2)}$$

which produces P-values between 0 (as y approaches minus infinity) and 1 (as y approaches plus infinity). Substituting Eqn. (1) into Eqn. (2), the probability of a good advertisement, thus, becomes the following:

$$P(\text{good } ad \mid ad \text{ selection}) = f_g(\text{session features } x_1, x_2, x_3 \ldots) \qquad \text{Eqn. (3)}$$
$$= \frac{e^{(c_{g0} + c_{g1} * x_1 + c_{g2} * x_2 + \ldots)}}{1 + e^{(c_{g0} + c_{g1} * x_1 + c_{g2} * x_2 + \ldots)}}$$

where $c_{g0}$ is the constant of the equation, and $c_{gn}$ is the coefficient of the session feature predictor variable $x_n$. The probability of a bad advertisement may, similarly, be determined by the following:

$$P(\text{bad } ad \mid ad \text{ selection}) = f_b(\text{session features } x_1, x_2, x_3 \ldots) \quad \text{Eqn. (4)}$$

$$= \frac{e^{(c_{b0}+c_{b1}*x_1+c_{b2}*x_2+\ldots)}}{1 + e^{(c_{b0}+c_{b1}*x_1+c_{b2}*x_2+\ldots)}}$$

where $c_{b0}$ is the constant of the equation, and $c_{bn}$ is the coefficient of the session feature predictor variables $x_n$.

A fit of the statistical model may be tested to determine which session features are correlated with good or bad quality advertisements. If a logistic regression technique is used to determine the statistical model, the goal of logistic regression is to correctly predict the outcome for individual cases using the most parsimonious model. To accomplish this goal, a model is created that includes all predictor variables (e.g., session features) that are useful in predicting the outcome of the dependent y variable. To construct the statistical model, logistic regression can test the fit of the model after each coefficient ($c_n$) is added or deleted, called stepwise regression. For example, backward stepwise regression may be used, where model construction begins with a full or saturated model and predictor variables, and their coefficients, are eliminated from the model in an iterative process. The fit of the model is tested after the elimination of each variable to ensure that the model still adequately fits the data. When no more predictor variables can be eliminated from the model, the model construction has been completed. The predictor variables that are left in the model, each corresponding to a measured session feature, identify the session features that are correlated with good or bad advertisements. Logistic regression, thus, can provide knowledge of the relationships and strengths among the different predictor variables. The process by which coefficients, and their corresponding predictor variables, are tested for significance for inclusion or elimination from the model may involve several different known techniques. Such techniques may include the Wald test, the Likelihood-Ratio test, or the Hosmer-Lemshow Goodness of Fit test. These coefficient testing techniques are known in the art and are not further described here. In other implementations, existing techniques for cross validation and independent training may be used instead of techniques of classical estimation and testing of regression coefficients, as described above.

Other existing statistical techniques, instead of, or in addition to logistic regression, may be used to derive a statistical model consistent with principles of the invention. For example, a "stumps" model, using "boosting" techniques may be used to derive the statistical model. As one skilled in the art will recognize, "boosting" is a machine learning technique for building a statistical model by successively improving an otherwise weak statistical model. The basic idea is to repeatedly apply the same algorithm to an entire training data set, but differentially weight the training data at each stage. The weights are such that cases that are well-fit by the model through stage k receive relatively small weights at stage k+1, while cases that are ill-fit by the model through stage k receive relatively large weights at stage k+1.

Stumps are a weak statistical model that can be applied at each stage. A stump is a 2-leaf classification tree consisting of a root node and a binary rule that splits the cases into two mutually exclusive subsets (i.e., the leaf nodes). A rule could take the form "ClickDuration<120 sec" and all cases with ClickDuration satisfying the rule go into one leaf node and those not satisfying the rule go into the other leaf node. Another rule could take the form "AdSelection was the last ad selection" and all cases with AdSelection satisfying the rule go into one leaf node and those not satisfying the rule go into the other leaf node.

Various algorithms can be used to fit the "boosted stump" model including, for example, gradient-based methods. Such algorithms may proceed as follows: given a set of weights, among all possible binary decision rules derived from session features that partition the cases into two leaves, choose that one which minimizes the (weighted) loss function associated with the algorithm. Some examples of loss functions are "Bernoulli loss" corresponding to a maximum likelihood method, and "exponential loss" corresponding to the well-known ADABoost method. After choosing the best binary decision rule at this stage, the weights may be recomputed and the process may be repeated whereby the best binary rule is chosen which minimizes the new (weighted) loss function. This process may be repeated many times (e.g., several hundred to several thousand) and a resampling technique (such as cross-validation) may be used to define a stopping rule in order to prevent over-fitting.

Boosted stumps have been shown to approximate additive logistic regression models whereby each feature makes an additive nonlinear contribution (on the logistic scale) to the fitted model. The sequence of stumps define the relationship between session features and the probability that an ad is rated "good". The sequence can be expressed by the statistical model:

$$P(\text{good } ad \mid \text{session feature } x) = \frac{e^{(c_0+c_1*B1(x)+c_2*B2(x)+\ldots)}}{1 + e^{(c_0+c_1*B1(x)+c_2*B2(x)+\ldots)}} \quad \text{Eqn. (5)}$$

where $Bk(x)=1$ if session feature x satisfies the kth binary rule, or $Bk(x)=0$ if session feature x does not satisfy the kth binary rule. The coefficients $c_k$, k=1, . . . , are a by-product of the algorithm and relate to the odds of a good ad at the kth binary rule. In practice, given session feature x, each binary rule can be evaluated and the corresponding coefficients accumulated to get the predicted probability of a good ad. A statistical model, similar to Eqn. (5) above, may similarly be derived that defines the relationship between session features and the probability that an ad is rated "bad."

Though logistic regression and boosted stumps have been described above as exemplary techniques for constructing a statistical model, one skilled in the art will recognize that other existing statistical techniques, such as, for example, regression trees may be used to derive the statistical model consistent with principles of the invention.

Exemplary Process for Determining Predictive Values Related to Ad Quality

Figure 14:
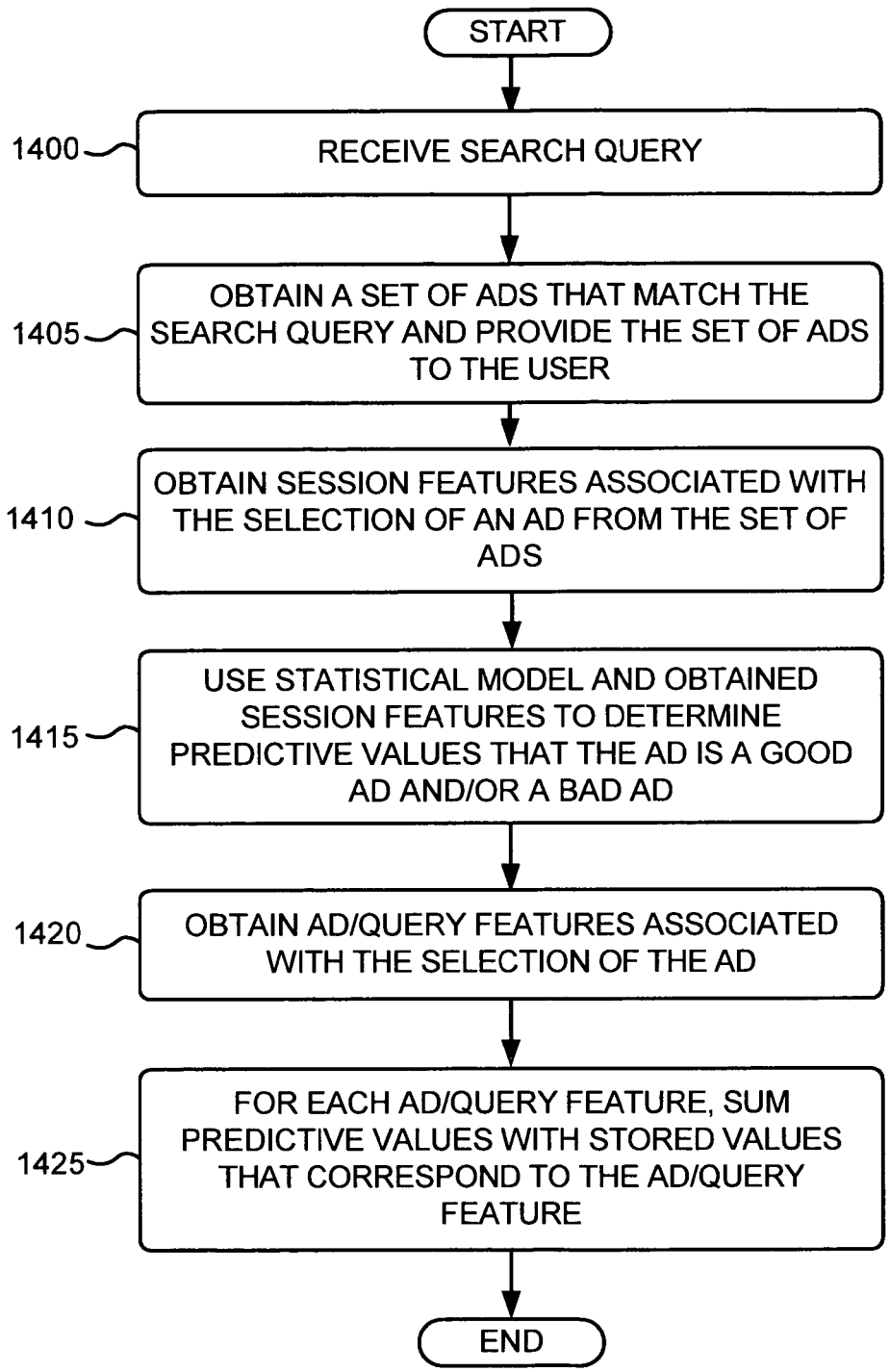
FIG. 14 is a flowchart of an exemplary process for determining predictive values relating to the quality of an advertisement according to an implementation consistent with the principles of the invention.

FIG. 14 is a flowchart of an exemplary process for determining predictive values relating to the quality of an advertisement according to an implementation consistent with the principles of the invention. As one skilled in the art will appreciate, the process exemplified by FIG. 14 can be implemented in software and stored on a computer-readable memory, such as main memory 430, ROM 440, or storage device 450 of servers 320 or 330 or client 310, as appropriate.

The exemplary process may begin with the receipt of a search query (block 1400). A user may issue the search query to server 320 for execution by search engine system 325. A set of ads that match the received search query may be obtained by search engine system 325 (block 1405). Search engine system 325 may execute a search, based on the received search query, to ascertain the set of ads, and other documents, that match the search query. Search engine system 325 may provide the set of ads, and a list of the other documents, to the user that issued the search query.

Figure 15:
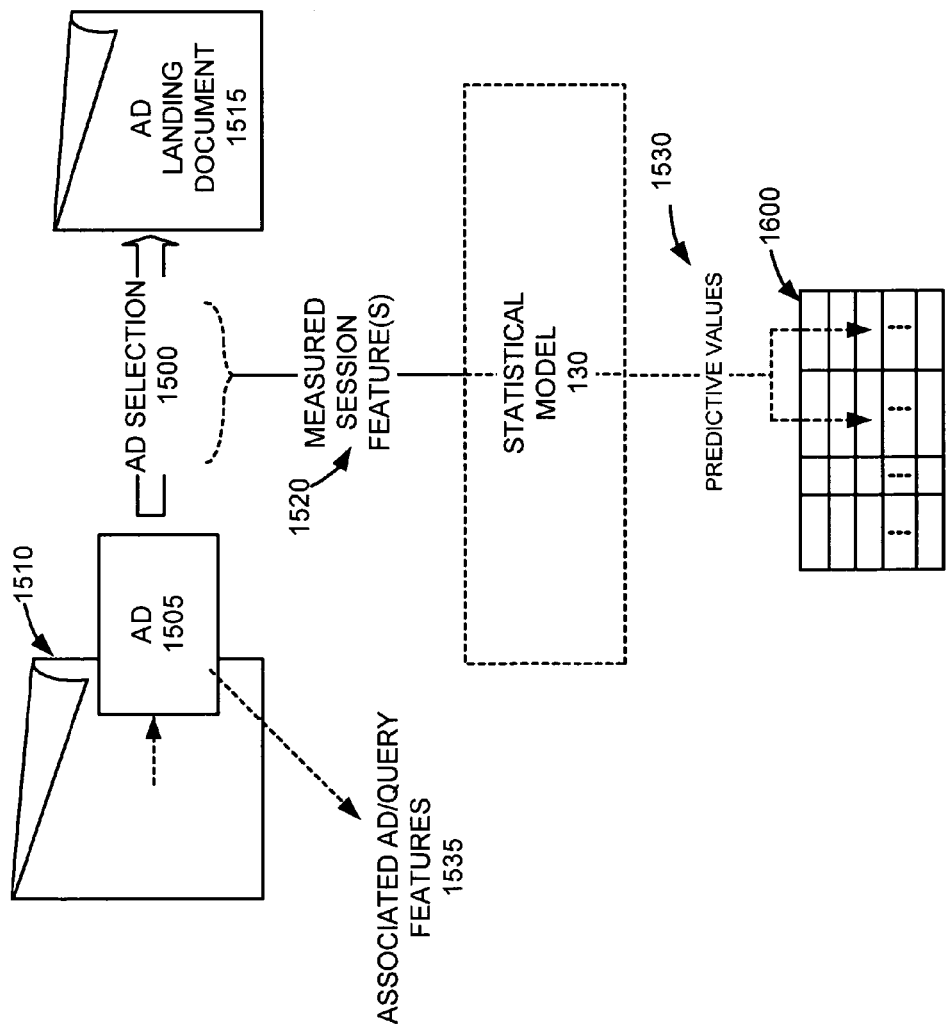
FIG. 15 is a diagram that graphically illustrates the exemplary process of FIG. 14 consistent with an aspect of the invention.

Session features associated with the selection of an ad from the set of ads may be obtained (block 1410). The session features may be measured in real-time during user ad selection or may be obtained from logs of recorded user behavior associated with ad selection. As shown in FIG. 15, a user may select 1500 an ad 1505 associated with a document 1510 (e.g., a document containing search results and relevant ads). An ad landing document 1515 may be provided to the user in response to selection of the ad 1505. As shown in FIG. 15, session features 1520 associated with the selection 1500 of ad 1505 may be measured. The measured session features may include any type of user behavior associated with the selection of an advertisement, such as those described above with respect to block 510 (FIG. 5).

The statistical model, derived in block 520 above, and the obtained session features may be used to determine predictive values 1530 that the ad is a good ad and/or a bad ad (block 1415). The predictive values may include a probability value (e.g., derived using Eqn. (3) or (5) above) that indicate the probability of a good ad given session features associated with user selection of that ad. The predictive values may also include a probability value (Eqn. (4) above) that indicates the probability of a bad ad given measured session features associated with user selection of that ad. Therefore, session feature values may be input into Eqn. (3), (4) and/or (5) to obtain a predictive value(s) that the selected ad is good or bad. For example, values for session features $x_1$, $x_2$, $x_3$ and $x_4$ may be input into Eqn. (3) to obtain a probability value for P(good ad|session features $x_1$, $x_2$, $x_3$, $x_4$). As shown in FIG. 15, the measured session features 1520 may be input into statistical model 130 and statistical model 130 may output predictive values 1530 for the ad 1505.

Ad/query features associated with the selection of the advertisement may be obtained (block 1420). As shown in FIG. 15, the ad/query features 1535 may be obtained in association with selection 1500 of the ad 1505. The ad/query features 1535 may include an identifier associated with the advertiser of ad 1505 (e.g., a visible uniform resource locator (URL) of the advertiser), a keyword that ad 1505 targets, words in the search query issued by the user that ad 1505 did not target, and/or a word in the search query issued by the user that the advertisement did not target but which is similar to a word targeted by advertisement 1505. Other types of ad or query features, not described above, may be used consistent with principles of the invention. For example, any of the above-described ad/query features observed in combination (e.g., a pairing of two ad/query features) may be used as a single ad query/feature.

For each obtained ad/query feature (i.e., obtained in block 1420 above), the determined predictive values may be summed with stored values that correspond to the ad/query feature (block 1425). The determined predictive values may be summed with values stored in a data structure, such as, for example, data structure 1600 shown in FIG. 16. As shown in FIG. 16, data structure 1600 may include multiple ad/query features 1610-1 through 1610-N, with a "total number of ad selections" 1620, a total "good" predictive value 1630 and a total "bad" predictive value 1640 being associated with each ad/query feature 1610. Each predictive value determined in block 1405 can be summed with a current value stored in entries 1630 or 1640 that corresponds to each ad/query feature 1610 that is further associated with the advertisement and query at issue. As an example, assume that an ad for "1800flowers.com" is provided to a user in response to the search query "flowers for mother's day." The session features associated with the selection of the ad return a probability P(good ad|ad selection) of 0.9. Three ad/query features are associated with the ad and query: the query length (the number of terms in the query), the visible URL of the ad, and the number of words that are in the query, but not in the keyword that's associated with the ad. For each of the three ad/query features, a corresponding "total number of ad selections" value in entry 1620 is incremented by one, and 0.9 is added to each value stored in the total good predictive value 1630 that corresponds to each of the ad/query features.

As shown in FIG. 15, each of the determined predictive values 1530 may be summed with a current value in data structure 1600. Blocks 1400 through 1425 may be selectively repeated for each selection of an ad, by one or more users, to populate data structure 1600 with numerous summed predictive values that are associated with one or more ad/query features.

Exemplary Odds Estimation Process

Figure 17:
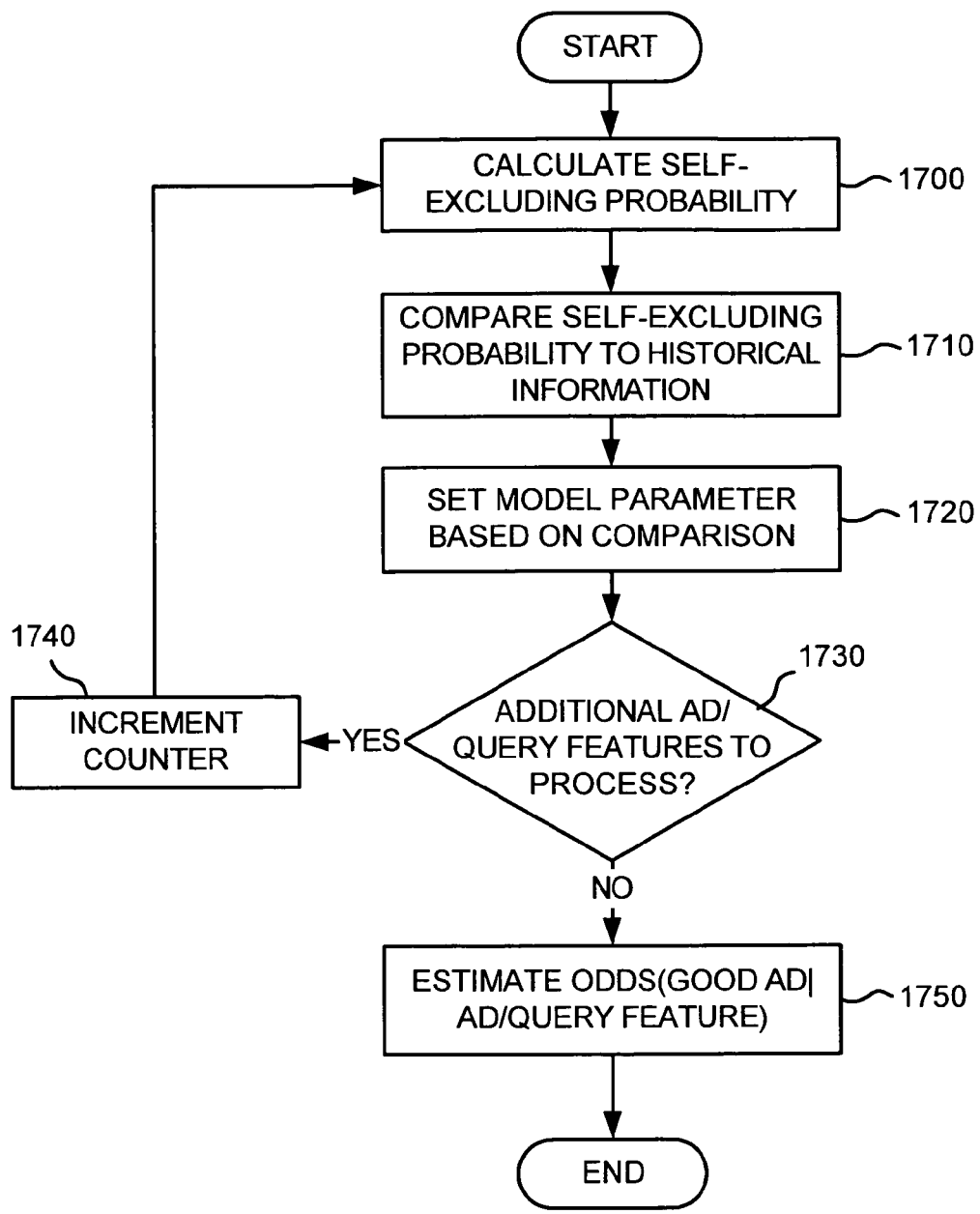
FIGS. 17 and 18 are flow charts of an exemplary process for estimating odds of good or bad qualities associated with advertisements using the predictive values determined in the exemplary process of FIG. 14 consistent with principles of the invention.
Figure 18:
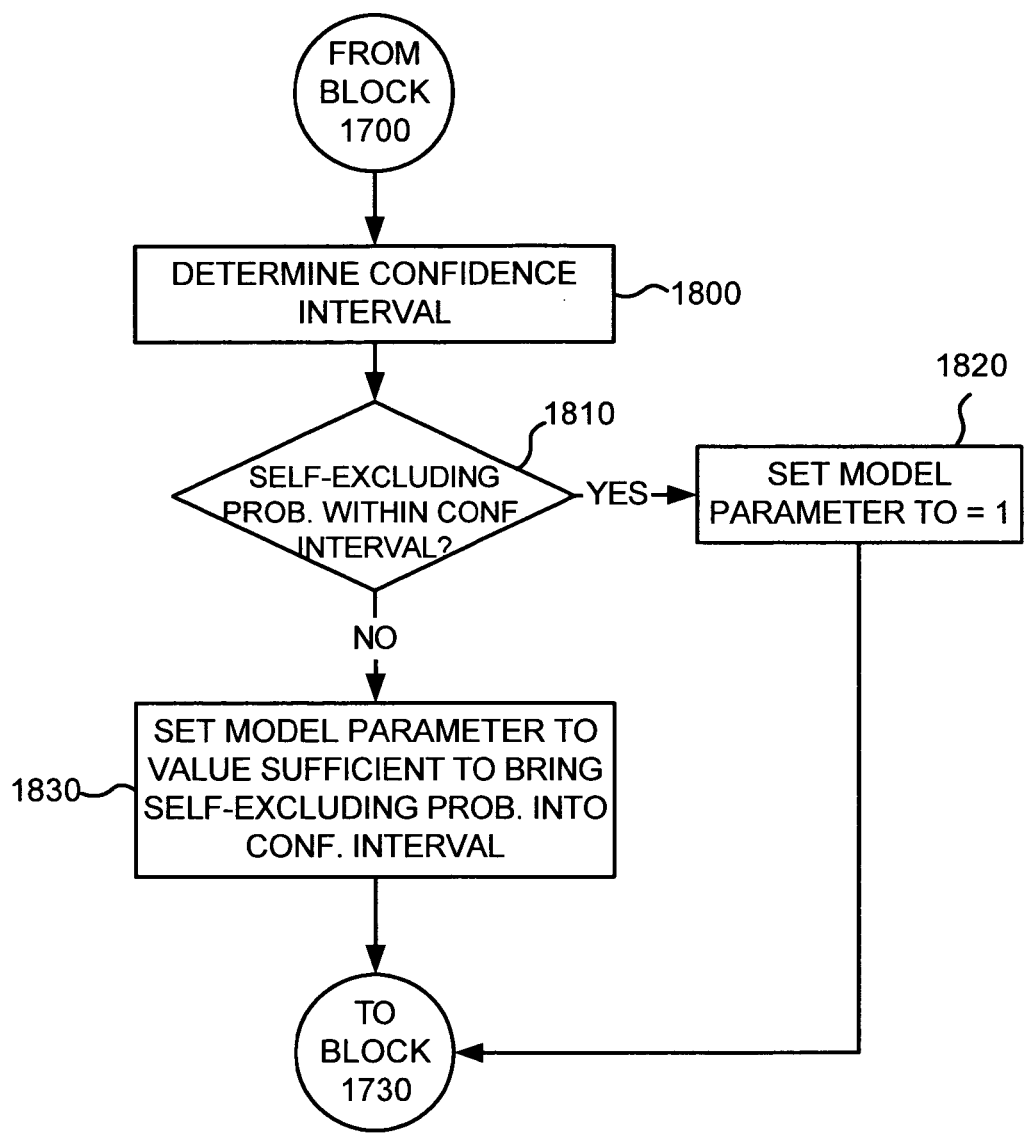

FIGS. 17 and 18 are flowcharts of an exemplary process for estimating odds of good or bad qualities associated with advertisements using the total predictive values 1630 or 1640 determined in block 1425 of FIG. 14. As one skilled in the art will appreciate, the process exemplified by FIGS. 17 and 18 can be implemented in software and stored on a computer-readable memory, such as main memory 430, ROM 440, or storage device 450 of servers 320 or 330 or client 310, as appropriate.

The estimated odds that a given advertisement is good or bad is a function of prior odds that the given advertisement was good or bad, and one or more model parameters associated with ad/query features associated with selection of the given advertisement. The model parameters may be calculated using an iterative process that attempts to solve for the parameter values that produce the best fit of the predicted odds of a good or bad advertisement to the actual historical data used for training.

The model parameters associated with each ad/query feature may consist of a single parameter, such as a multiplier on the probability or odds of a good advertisement or bad advertisement. Alternatively, each ad/query feature may have several model parameters associated with it that may affect the predicted probability of a good or bad advertisement in more complex ways.

In the following description, various odds and probabilities are used. The odds of an event occurring and the probability of an event occurring are related by the expression: probability=odds/(odds+1). For example, if the odds of an event occurring are ½ (i.e., the odds are "1:2" as it is often written), the corresponding probability of the event occurring is ⅓. According to this convention, odds and probabilities may be considered interchangeable. It is convenient to express calculations in terms of odds rather than probabilities because odds may take on any non-negative value, whereas probabilities must lie between 0 and 1. However, it should be understood that the following implementation may be performed using probabilities exclusively, or using some other similar representation such as log(odds), with only minimal changes to the description below.

FIG. 17 is a flow diagram illustrating one implementation of a prediction model for generating an estimation of the odds that a given advertisement is good or bad based on ad/query features associated with selection of the advertisement. In accordance with one implementation of the principles of the invention, the odds of a good or bad ad may be calculated by multiplying the prior odds ($q_0$) of a good ad or bad ad by a model parameter ($m_i$) associated with each ad/query feature ($k_i$), henceforth referred to as an odds multiplier. Such a solution may be expressed as:

$$q = q_0 . m_1 . m_2 . m_3 \ldots m_m.$$

In essence, the odds multiplier m for each ad/query feature k may be a statistical representation of the predictive power of this ad/query feature in determining whether or not an advertisement is good or bad.

In one implementation consistent with principles of the invention, the model parameters described above may be continually modified to reflect the relative influence of each ad/query feature k on the estimated odds that an advertisement is good or bad. Such a modification may be performed by comparing the average predicted odds that advertisements with this query/ad feature are good or bad, disregarding the given ad/query feature, to an estimate of the historical quality of advertisements with this ad/query feature. In this manner, the relative value of the analyzed ad/query feature k may be identified and refined.

Turning specifically to FIG. 17, for each selected ad/query feature ($k_i$), an average self-excluding probability ($P_i$) may be initially calculated or identified (act 1700). In one implementation, the self-excluding probability ($P_i$) is a value representative of the relevance of the selected ad/query feature and may measure the resulting odds that an advertisement is good or bad when the selected ad/query feature's model parameter ($m_i$) is removed from the estimated odds calculation. For ad/query feature 3, for example, this may be expressed as:

$$P_{3n} + ((q_0 . m_1 . m_2 . m_3 \ldots m_n)/m_3/(((q_0 . m_1 . m_2 . m_3 \ldots m_n)/m_3 + 1).$$

In one embodiment, the self-excluding probability for each ad/query feature may be maintained as a moving average, to ensure that the identified self-excluding probability converges more quickly following identification of a model parameter for each selected ad/query feature. Such a moving average may be expressed as:

$$P_{in}(\text{avg}) = \alpha P_{i(n-1)}(\text{avg}) + (1-\alpha) P_{in},$$

where $\alpha$ is a statistically defined variable very close to 1 (e.g., 0.999) used to control the half-life of the moving average. As shown in the above expression, the value of $P_i$ for the current number of ad selections (n) (e.g., a current value for "total number of ad selections" 1620 for ad/query feature $k_i$) is weighted and averaged by the value of $P_i$ as determined at the previous ad selection (e.g., n−1).

Next, the average self-excluding probability ($P_i$(avg)), may be compared to historical information relating to the number of advertisement selections observed and the odds of a good or bad advertisement observed for the observed selections (act 1710). The model parameter $m_i$ associated with the selected ad/query feature $k_i$ may then be generated or modified based on the comparison of act 1710 (act 1720) (as further described below with respect to blocks 1820 and 1830 of FIG. 18).

FIG. 18 is a flow diagram illustrating one exemplary implementation of blocks 1710-1720 of FIG. 17. Initially, a confidence interval relating to the odds of a good ad or bad ad may be determined (act 1800). Using a confidence interval technique enables more accurate and stable estimates when ad/query features k having lesser amounts of historical data are used. In one implementation, the confidence interval includes a lower value $L_i$ and an upper value $U_i$ and is based on the number of ad selections ($n_i$) (e.g., a current value in "total number of ad selections" 1620 in data structure 1600 for ad/query feature $k_i$) and total goodness/badness ($j_i$) observed for the selected ad/query feature (e.g., a current total "good" predictive value 1630 or total "bad" predictive value 1640 in data structure 1600 for ad/query feature $k_i$). For example, the confidence interval may be an 80% confidence interval calculated in a conventional manner based on the number of ad selections (e.g., a current value in "total number of ad selections" 1620 in data structure 1600 for ad/query feature $k_i$) and total goodness or badness observed (e.g., a current total "good" predictive value 1630 or total "bad" predictive value 1640 in data structure 1600 for ad/query feature $k_i$). Following confidence interval calculation, it may then be determined whether the average self-excluding probability ($P_i$(avg)) falls within the interval (act 1810). If so, it may be determined that the selected ad/query feature ($k_i$) has no effect on the odds of a good ad or bad ad and its model parameter ($m_i$) may be set to 1, effectively removing it from the estimated odds calculation (act 1820). However, if it is determined that $P_i$(avg) falls outside of the confidence interval, then the model parameter ($m_i$) for the selected ad/query feature $k_i$ may be set to the minimum adjustment necessary to bring the average self-excluding probability ($P_i$(avg)) into the confidence interval (act 1830). This calculation may be expressed mathematically as:

$$m_i = [L_i(1-P_i(\text{avg}))]/[P_i(\text{avg})(1-L_i)]$$

Returning now to FIG. 17, once the model parameter $m_i$ for the selected ad/query feature $k_i$ is calculated, it may be determined whether additional ad/query features (e.g., of ad/query features 1610-1 through 1610-N of FIG. 16) remain to be processed (i.e., whether $k_i < k_m$, where m equals the total number of ad/query features in data structure 1600) (act 1730). If additional ad/query features remain to be processed, the counter variable i may be incremented (act 1740) and the process may return to act 1700 to process the next ad/query feature $k_i$. Once model parameters for all ad/query features have been calculated or modified, the odds of a good ad or bad ad may be estimated using the equation $q = q_0 . m_1 . m_2 m_3 \ldots m_m$ (act 1750). The estimated odds of a good ad (e.g., ODDS (good ad|ad query feature)) may be stored in a "good" ad odds entry 1650 of data structure 1600 that corresponds to the ad/query feature 1610. The estimated odds of a bad ad (e.g., ODDS(bad ad|ad/query feature)) may be stored in "bad" ad odds entry 1660 of data structure 1600 that corresponds to the ad/query feature 1610.

In one implementation consistent with principles of the invention, the odds prediction model may be trained by processing log data as it arrives and accumulating the statistics mentioned above (e.g., ad selections, total goodness or badness, self-including probabilities, etc.). As additional ad selections occur, the confidence intervals associated with each ad/query feature may shrink and the parameter estimates may become more accurate. In an additional implementation, training may be accelerated by reprocessing old log data. When reprocessing log data, the estimated odds of a good ad or bad ad may be recalculated using the latest parameter or odds multiplier values. This allows the prediction model to converge more quickly.

Exemplary Ad Quality Prediction Process

Figure 19:
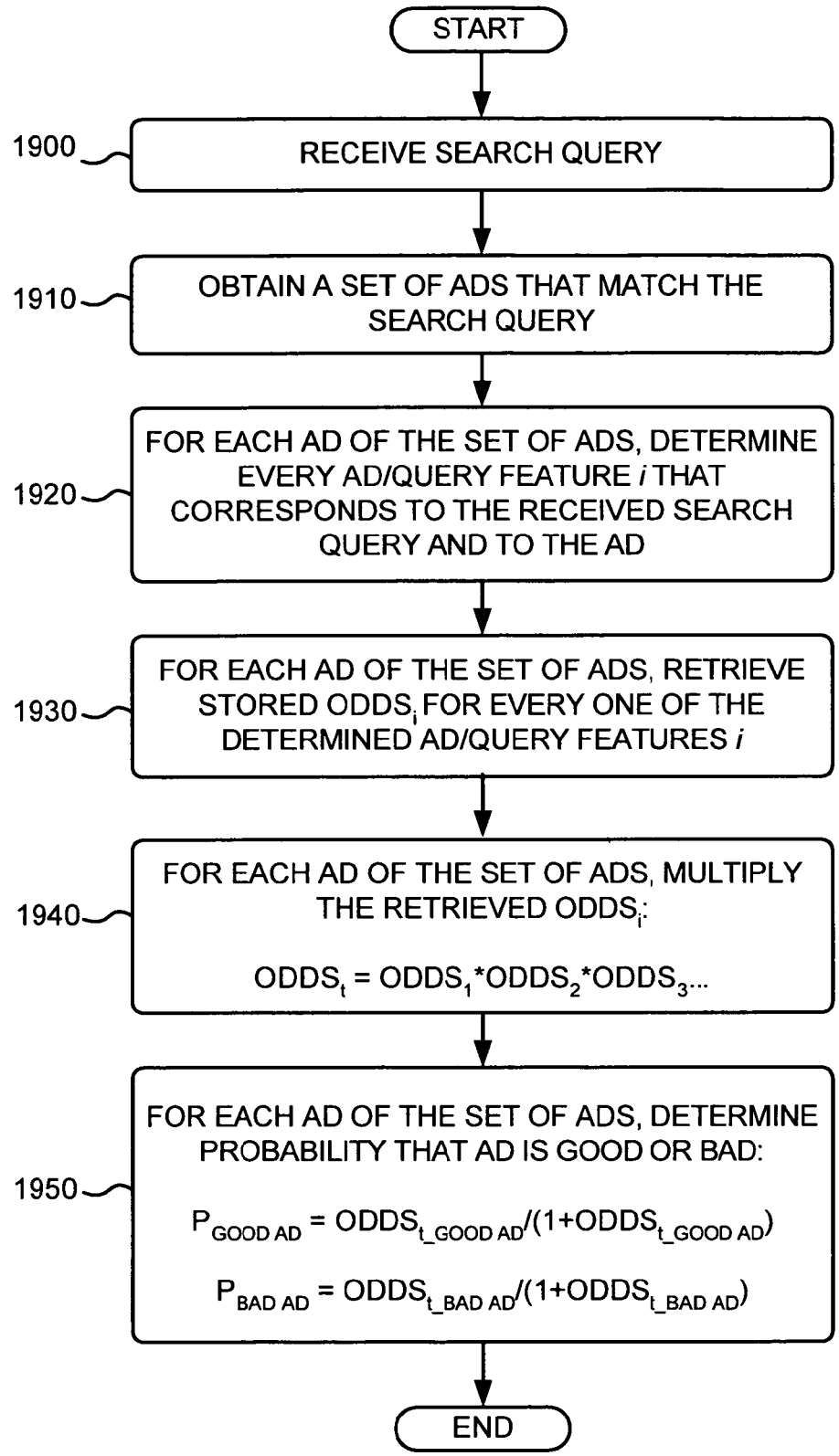
FIG. 19 is a flowchart of an exemplary process for predicting the quality of advertisements according to an implementation consistent with the principles of the invention.

FIG. 19 is a flowchart of an exemplary process for predicting the quality of advertisements according to an implementation consistent with the principles of the invention. As one skilled in the art will appreciate, the process exemplified by FIG. 19 can be implemented in software and stored on a computer-readable memory, such as main memory 430, ROM 440, or storage device 450 of servers 320 or 330 or client 310, as appropriate.

The exemplary process may begin with the receipt of a search query from a user (block 1900). The user may issue the search query to server 320 for execution by search engine system 325. A set of ads that match the received search query may be obtained by search engine system 325 (block 1910). Search engine system 325 may execute a search, based on the received search query, to ascertain the set of ads, and other documents, that match the search query. For each ad of the set of ads, every ad/query feature that corresponds to the received search query and the ad may be determined (block 1920). The ad/query features for each search query and ad pair may include include an identifier associated with the advertiser (e.g., a visible uniform resource locator (URL) of the advertiser), a keyword that the ad targets, words in the search query issued by the user that ad did not target, and/or a word in the search query issued by the user that the advertisement did not target but which is similar to a word targeted by the advertisement. Other types of ad or query features, not described above, may be used consistent with principles of the invention. For example, any of the above-described ad/query features observed in combination (e.g., a pairing of two ad/query features) may be used as a single ad query/feature.

Figure 20:
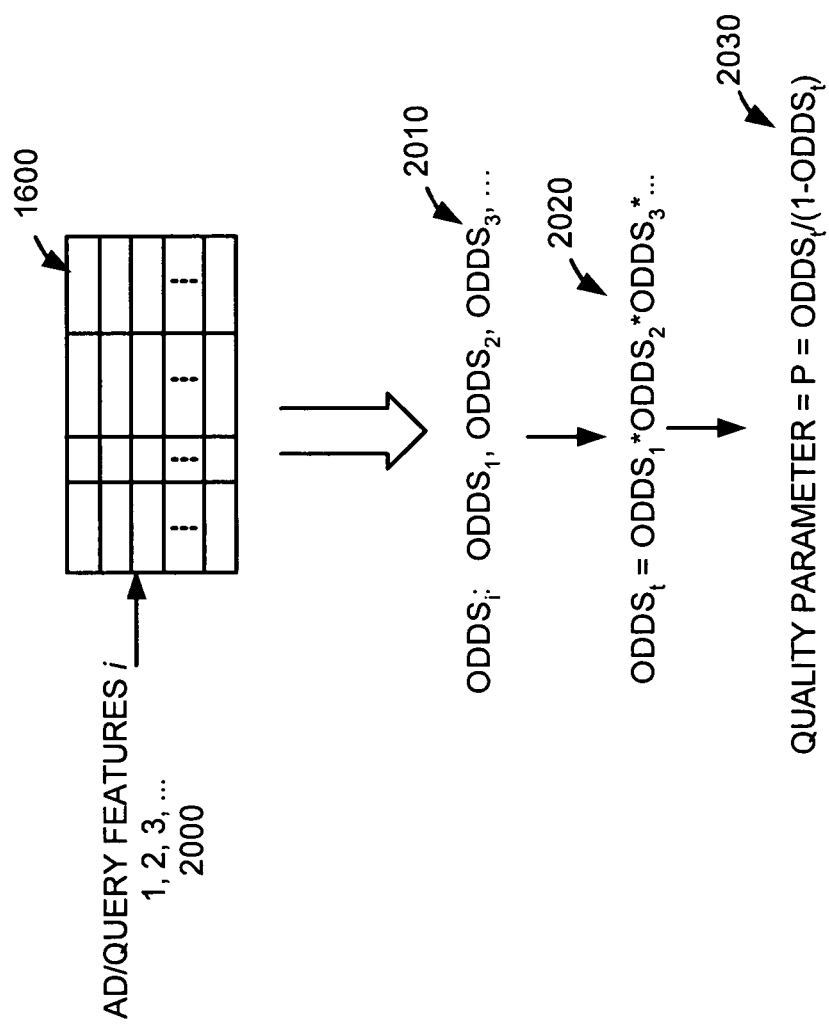
FIG. 20 is a diagram that graphically illustrates the exemplary process of FIG. 19 consistent with an aspect of the invention.

For each ad of the set of ads, stored $ODDS_i$ (e.g., ODDS (good ad|ad/query feature) 1650, ODDS (bad ad|ad/query feature) 1660), for every one of the determined ad/query features i, may be retrieved from data structure 1600 (block 1930). As shown in FIG. 20, data structure 1600 may be indexed with ad/query features 2000 that correspond to the search query and the ad to retrieve one or more $ODDS_i$ 2010 associated with each ad/query feature. For example, as shown in FIG. 16, a "good" ad odds value 1650 corresponding to each ad/query feature 1610 may be retrieved. As another example, as shown in FIG. 16, a "bad" ad odds value 1660 corresponding to each ad/query feature 1610 may be retrieved.

For each ad of the set of ads, the retrieved $ODDS_i$ for each ad/query feature i may be multiplied together (block 1940) to produce a total ODDS value ($ODDS_t$):

$$ODDS_t = ODDS_1 * ODDS_2 * ODDS_3 *$$  Eqn. (6)

For example, the "good" ad odds values 1650 for each ad/query feature may be multiplied together to produce a total good ad odds value $ODDS_{t\_GOOD\ AD}$. As another example, the "bad" ad odds values 1660 for each ad/query feature may be multiplied together to produce a total bad ad odds value $ODDS_{t\_BAD\ AD}$. As shown in FIG. 20, the ODDS 2010 retrieved from data structure 1600 may be multiplied together to produce a total odds value $ODDS_t$ 2020.

For each ad of the set of ads, a quality parameter that may include a probability that the ad is good ($P_{GOOD\ AD}$) and/or that the ad is bad ($P_{BAD\ AD}$) may be determined (block 1950):

$$P_{GOOD\ AD} = ODDS_{t\_GOOD\ AD}/(1+ODDS_{t\_GOOD\ AD})$$  Eqn. (7)

$$P_{BAD\ AD} = ODDS_{t\_BAD\ AD}/(1+ODDS_{t\_BAD\ AD})$$  Eqn. (8)

As shown in FIG. 20, the total odds value $ODDS_t$ 1820, and equations (7) or (8) may be used to derive a quality parameter (P) 2030.

Exemplary Ad Filtering, Ranking and Promotion Process

Figure 21:
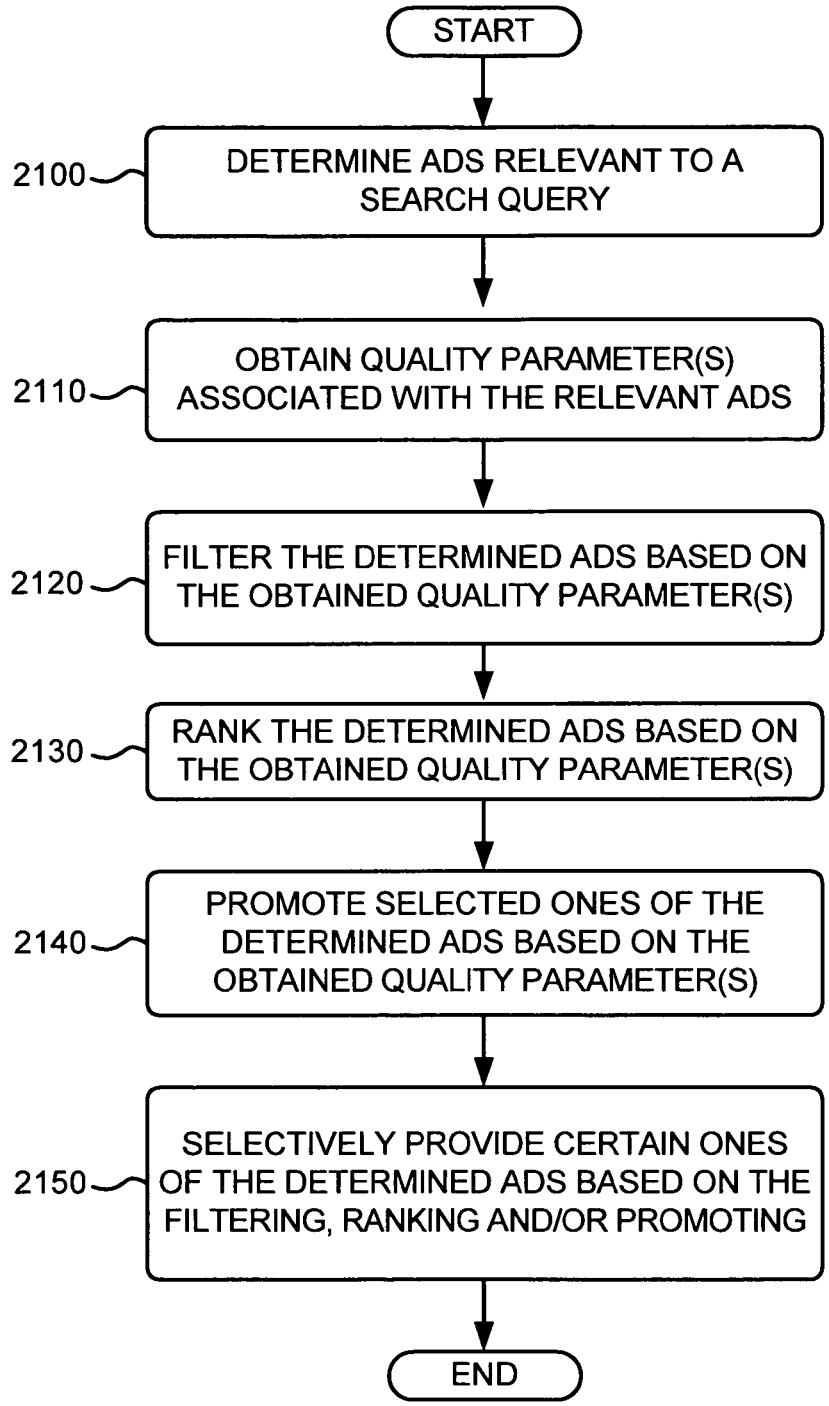
FIG. 21 is a flowchart of an exemplary process for filtering, ranking and/or promoting advertisements according to an implementation consistent with principles of the invention.

FIG. 21 is a flowchart of an exemplary process for filtering, ranking and/or promoting advertisements according to an implementation consistent with principles of the invention. As one skilled in the art will appreciate, the process exemplified by FIG. 21 can be implemented in software and stored on a computer-readable memory, such as main memory 430, ROM 440, or storage device 450 of servers 320 or 330 or client 310, as appropriate.

The exemplary process may begin with the determination of ads that are relevant to a search query (block 2100). A user may enter a search query in a search query document and the content of ads hosted by an ad publisher may be compared with the entered search query to determine which ads are relevant to the search query. For example, ads having content with the term "SUV" may be considered relevant to the search query "SUV."

One or more quality parameters associated with the relevant ads may be obtained (block 2110). The quality parameter(s) may include, for example, the quality parameter(s) determined in block 1950 above. The quality parameter(s) may, however, include any other type of parameter that is indicative of a quality of an advertisement, other than a click-through-rate (CTR).

The ads determined to be relevant may be filtered based on the obtained quality parameter(s) (optional block 2120). Filtering may disable (e.g., de-select) selected ones of the relevant ads so that they will not be provided (i.e., not shown) to the user that issued the search query, or that accessed the content of the particular document or site. The relevant ads may be filtered based on the one or more quality parameters obtained in block 2110 above, or based on any other type of ad quality parameter, in addition to a CTR. The relevant ads may be filtered based on a functional combination of the obtained quality parameter(s) and other parameters (e.g., CTR). For example, the obtained quality parameter(s) (QP) may be multiplied by CTR (i.e., QP*CTR) to filter the relevant ads. CTR measures the fraction of ad impressions that result in ad clicks. For example, if one out of 100 ad impressions results in an ad click, then the CTR of that advertisement is 1/100, or 1%. CTR may be estimated, as described in co-pending U.S. application Ser. No. 11/167,581, entitled "Accurately Estimating Advertisement Performance" and incorporated by reference herein. In one implementation, the quality parameter QP may include $P_{GOOD\ AD}$ determined in block 1950 above.

Figure 22:
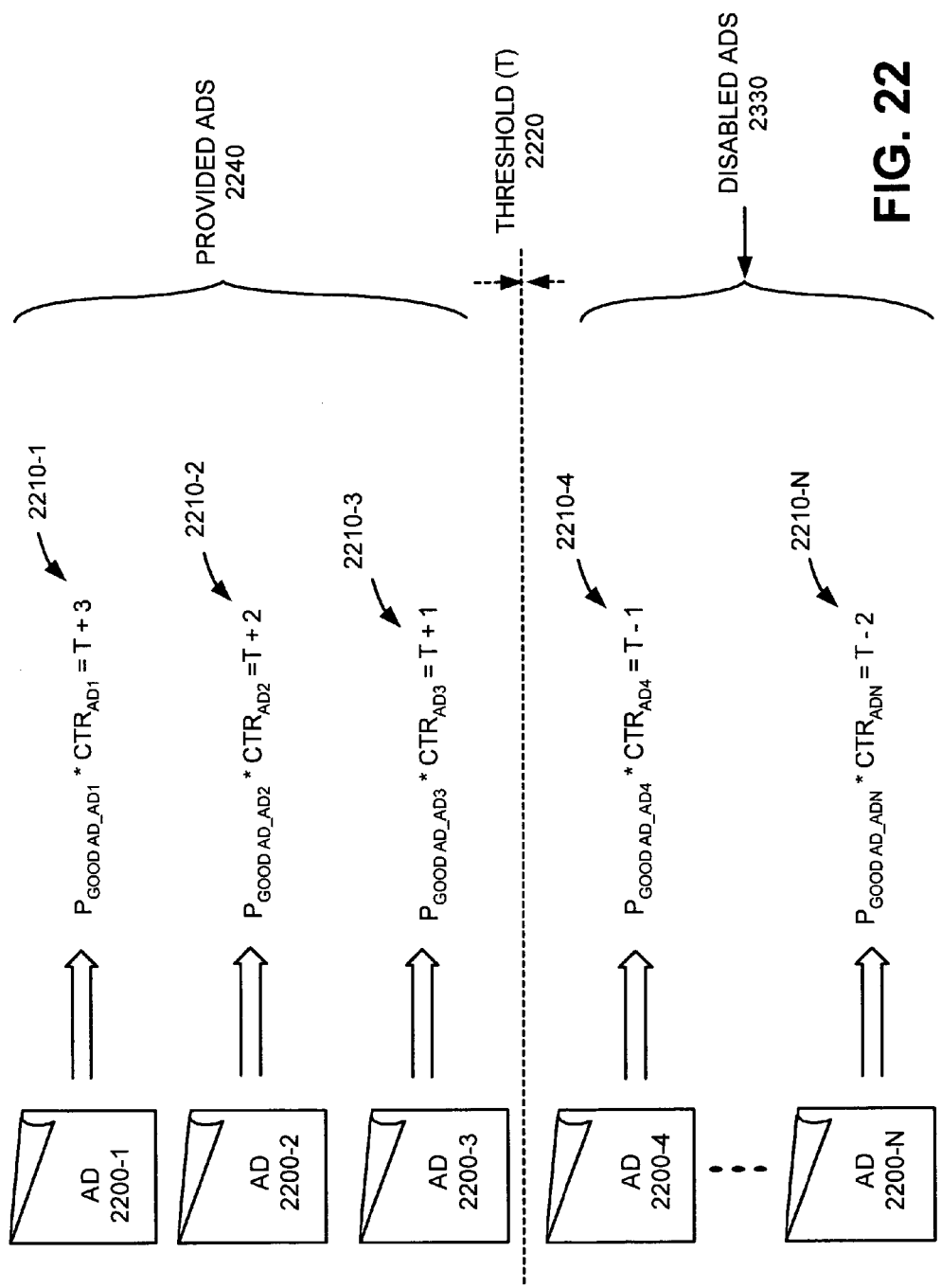
FIGS. 22-24 illustrate various examples of advertisement filtering consistent with aspects of the invention.

As an example, the functional combination $P_{GOOD\ AD}*CTR$ may be used as a disabling rule. For example, if $P_{GOOD\ AD}*CTR$ is low (e.g., less than a threshold value), then the ad will be disabled and, thus, not provided to the user. FIG. 22 illustrates an example of the filtering of multiple ads 2200-1 through 2200-N consistent with an aspect of the invention. For each ad 2200, a value 2210 for $P_{GOOD\ AD}*CTR$ may be determined and compared to a threshold value (T) 2220. Ads having values 2210 less than the threshold T 2220 may be disabled 2230, and ads having values 2210 equal to or greater than the threshold T 2220 may be provided 2240 (e.g., shown) to the user.

Figure 23:
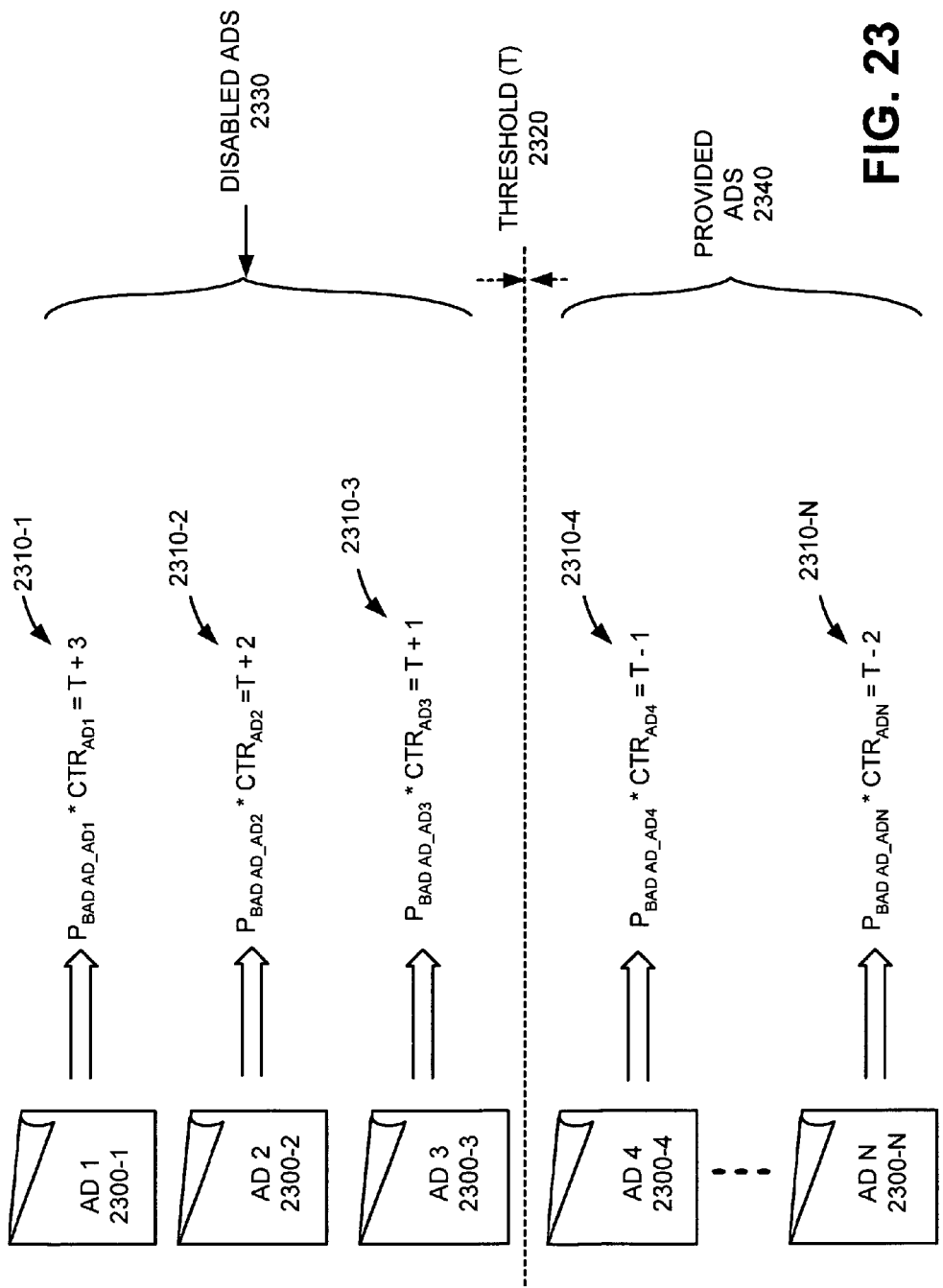

In another implementation, the quality parameter QP may include the value $P_{BAD\ AD}$ determined in block 1950 above and $P_{BAD\ AD}$ may be multiplied by CTR. For example, if $P_{BAD\ AD}*CTR$ is high (e.g., greater than a threshold value), then the ad will be disabled and, thus, not provided to the user. FIG. 23 illustrates an example of the filtering of multiple ads 2300-1 through 2300-N. For each ad 2300, a value 2310 for $P_{BAD\ AD}*CTR$ may be determined and compared to a threshold value (T) 2320. Ads having values 2310 greater than or equal to the threshold T 2020 may be disabled 2130 and ads having values 2310 less than the threshold T 2320 may be provided 2340 (e.g., shown) to the user.

Figure 24:
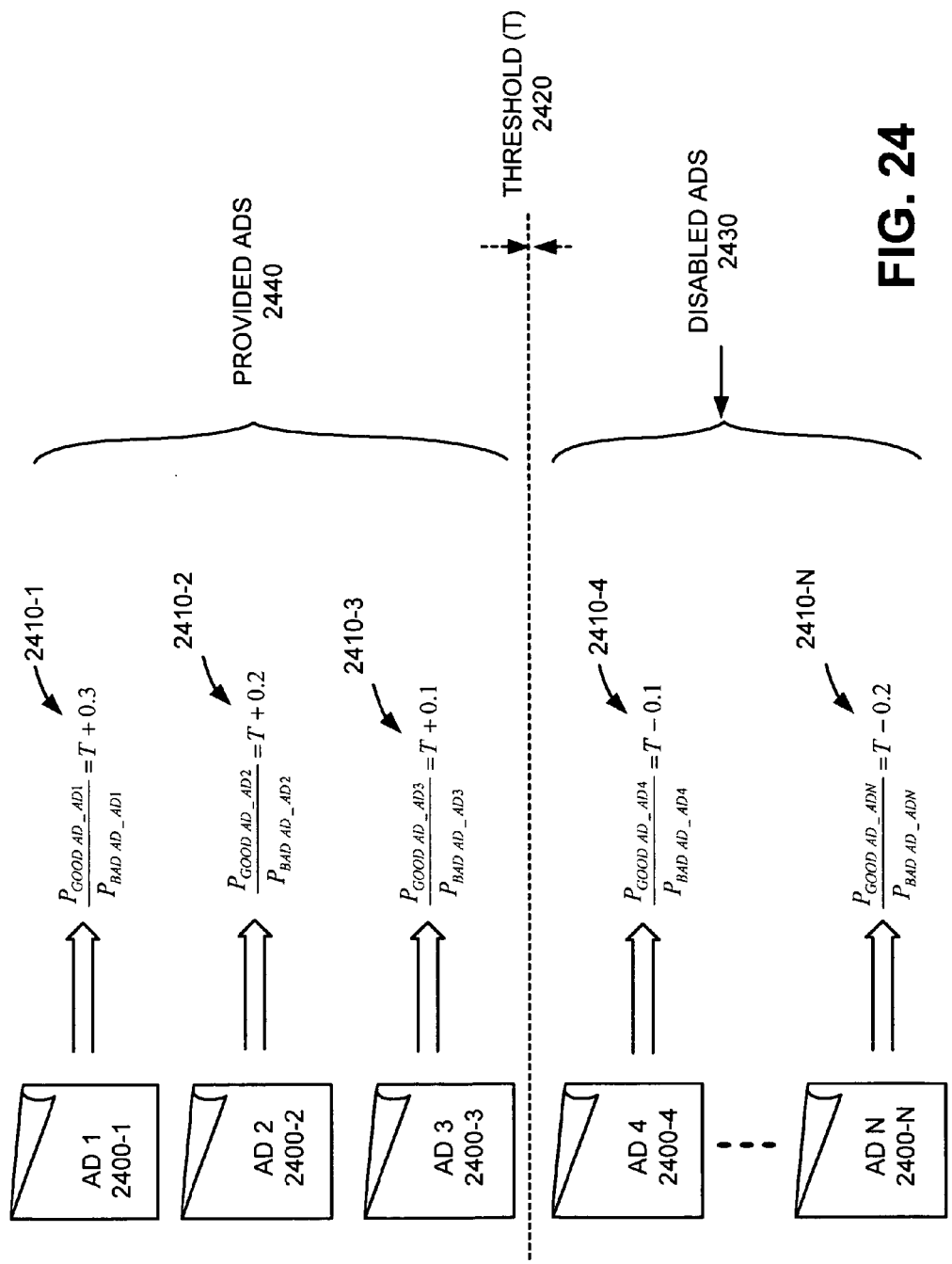

In yet another implementation, the ratio $P_{GOOD\ AD}/P_{BAD\ AD}$ may be used as a disabling rule. For example, if $P_{GOOD\ AD}/P_{BAD\ AD}$ is less than a threshold value, indicating that the probability that an ad is good is lower than the probability that the ad is bad, then the ad will be disabled and, thus, not provided to the user. FIG. 24 illustrates an example of the filtering of multiple ads 2400-1 through 2400-N. For each ad 2400, a value 2410 for $P_{GOOD\ AD}/P_{BAD\ AD}$ may be determined and compared to a threshold value (T) 2420. Ads having values 2410 less than the threshold T 2420 may be disabled 2430 and ads having values 2410 greater than or equal to the threshold T 2420 may be provided 2440 (e.g., shown) to the user.

The ads determined to be relevant may be ranked based on the obtained quality parameter(s) (optional block 2130). The relevant ads may be ranked based on the one or more quality parameters obtained in block 2110 above, or based on any other type of ad quality parameter, other than, or in addition to a CTR. The relevant ads may be ranked based on a functional combination of the obtained quality parameter(s) and other parameters (e.g., CTR). In one implementation, the quality parameter QP may include the value $P_{GOOD\ AD}$, determined in block 1950 above. In other implementations, the quality parameter QP may include the value $P_{BAD\ AD}$.

Figure 25:
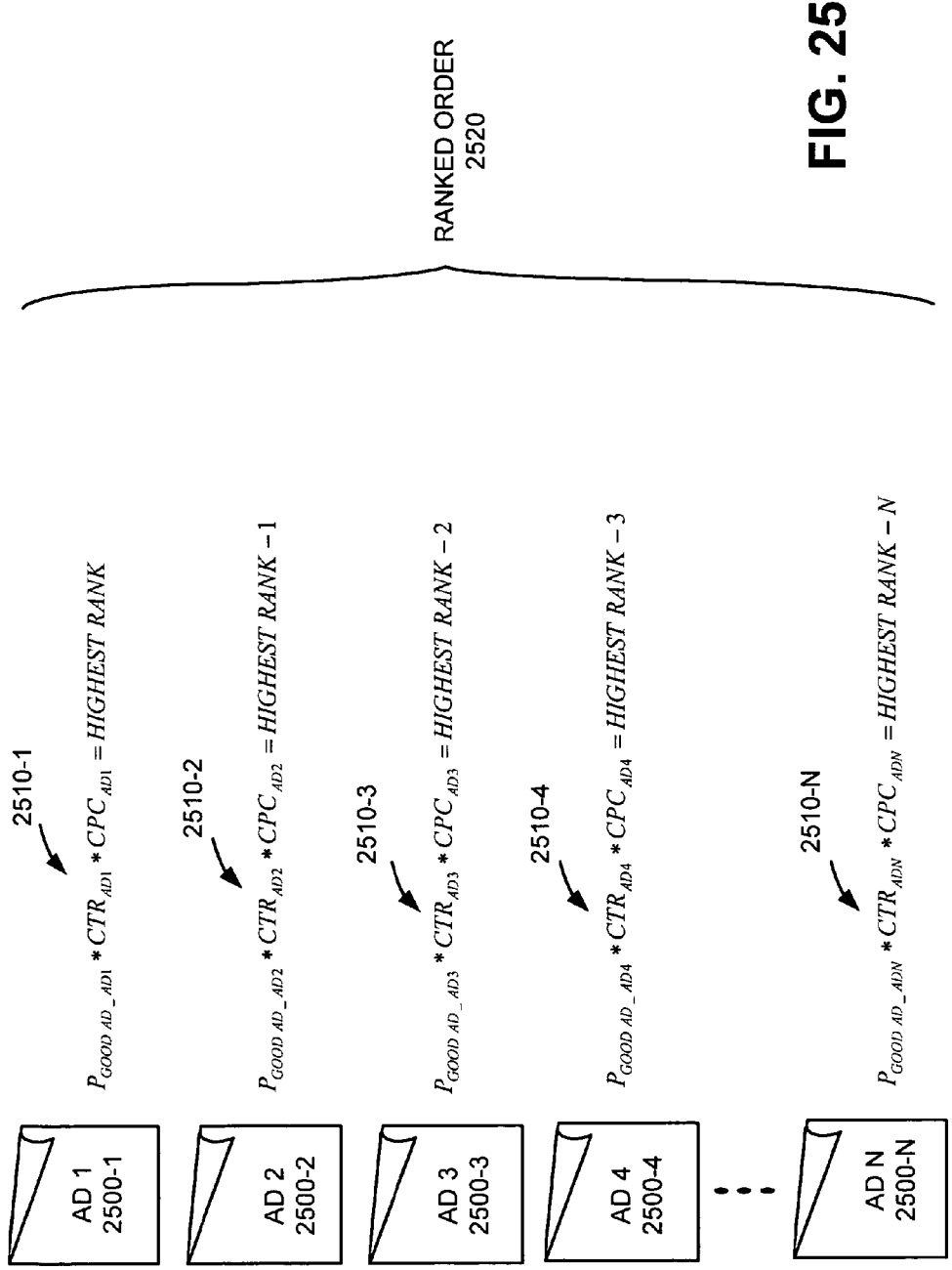
FIGS. 25 and 26 illustrate examples of advertisement ranking consistent with aspects of the invention.

The functional combination of the obtained quality parameter QP and other parameters may attempt to maximize value to the ad publishing entity, the advertisers, and the users. In one implementation, ads may be ranked using the following function:

$$RANK_{ADx} = P_{GOOD\ AD\_ADx} * CTR_{ADx} * CPC_{ADx} \quad \text{Eqn. (9)}$$

where CTR is the click-through-rate and CPC is the "cost per click" for that ad. CPC represents the value of an ad click to a given advertiser. FIG. 25 illustrates an example of the ranking of multiple ads 2500-1 through 2500-N. For each ad 2500, a value 2510 for $P_{GOOD\ AD} * CTR * CPC$ may be determined. A value 2510 for each ad in the set of relevant ads may be compared so that the ads may be re-ordered in a ranked order 2520. The ranked order 2520 may, for example, as shown in FIG. 25, rank the ads 2500 in ascending order, with the ad 2500-1 having the highest value 2510-1 being ranked first, and the ads 2500-2 through 2500-N having values 2510 less than value 2510-1 being ranked in descending order.

In another implementation, ads may be ranked using the following function:

$$RANK_{ADx} = CTR_{ADx} * CPC_{ADx} + ValueOfGoodAdToUser * P_{GOOD\ AD\_ADx} * CTR_{ADx} - CostofBadAdToUser * P_{BAD\ AD\_ADx} * CTR_{ADx} \quad \text{Eqn. (10)}$$

where CTR is the click-through-rate, CPC is the cost per click for that ad, ValueOfGoodAdToUser is the incremental gain in revenue that an ad publisher may receive from showing a good ad, and CostOfBadAdToUser is the incremental loss in long-term revenue that the ad publisher may sustain from providing a bad ad to the user. The value CTR*CPC represents the short-term revenue that an ad may receive.

The values ValueOfGoodAdToUser and CostOfBadAdToUser may be estimated in a number of different ways. In one technique, human factors experiments can be run, where users are shown a series of documents having only good ads, and then the users can be provided with a behavioral task to see how likely they are to use the ads. A different set of users can be shown a series of documents having only bad ads, and then this set of users can be provided with a behavioral task to see how likely they are to not use the ads. This can then be refined to see how many documents it takes to change the likelihood of clicking on ads in the behavioral task, and how varying the mix (e.g., a mix of good and bad ads) will change the likelihood. In another technique, session data may be used to observe the sequences of clicks that a user performs within a session, and to determine (by empirical measurement) the probability of further ad clicks after seeing a bad ad (and the same for a good ad).

In either of the techniques set forth above, the increased likelihood of a user clicking on an ad (if the user is shown good ads) or the decreased likelihood of a user clicking on an ad (if the user is shown bad ads) can be estimated. To derive the value ValueOfGoodAdToUser, the incremental increase can be multiplied by the average value of a click, while the value CostOfBadAdToUser can be derived by multiplying the incremental decrease by an average value of a click. In some implementations, the values ValueOfGoodAdToUser and CostOfBadAdToUser may be adjusted to customize the cost of a click per country or per-business (e.g., travel, finance, consumer goods, etc.) such that the values ValueOfGoodAdToUser and CostOfBadAdToUser have a different cost per click depending on the country, the language, and/or the business.

Figure 26:
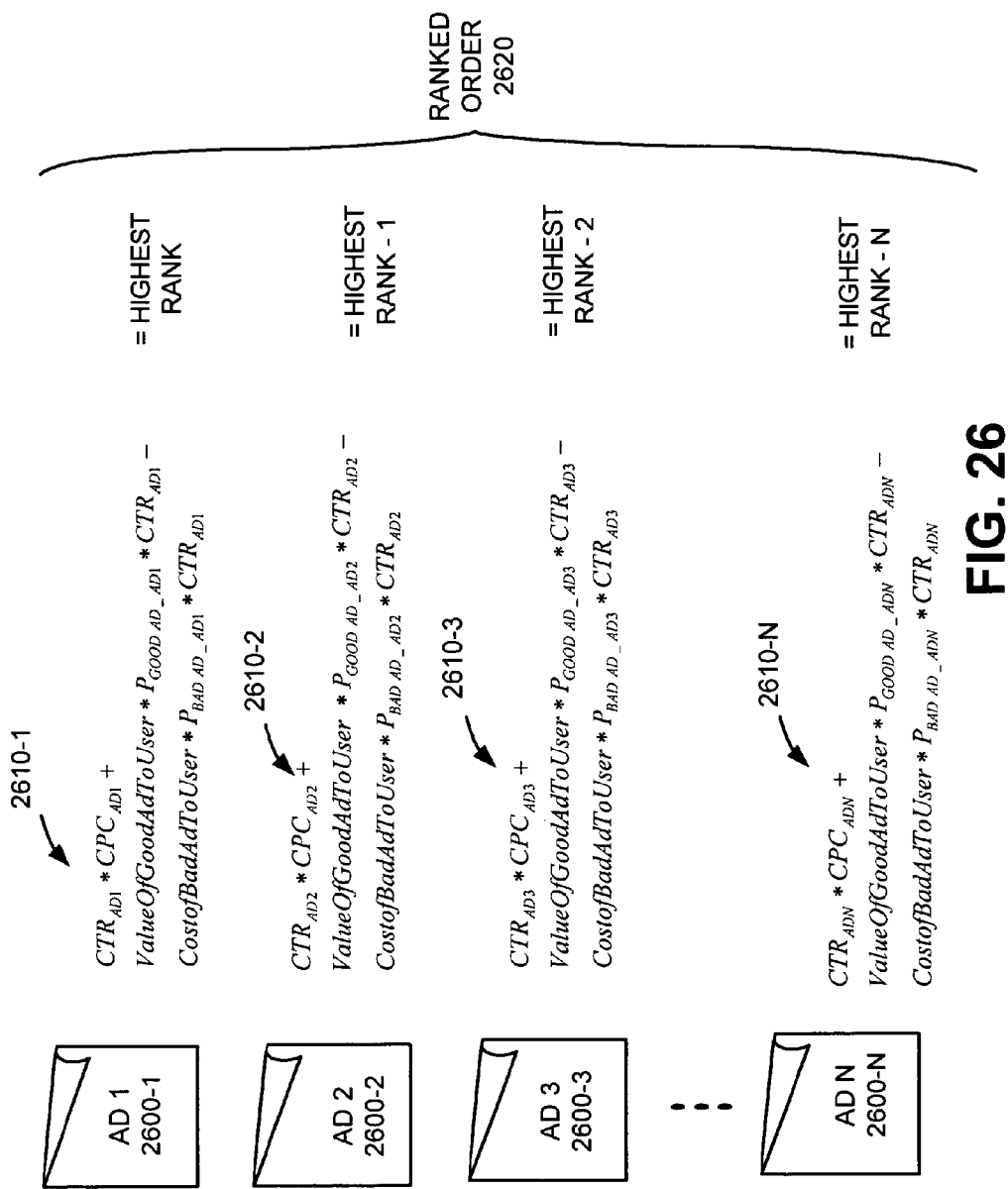

FIG. 26 illustrates an example of the ranking of multiple ads 2600-1 through 2600-N. For each ad 2600, a value 2610 may be determined using Eqn. (9) above. The values 2610 for each ad in the set of relevant ads may be compared so that the ads may be re-ordered in a ranked order 2620. The ranked order 2620 may, for example, as shown in FIG. 26, rank the ads 2600 in ascending order, with the ad 2600-1 having the highest value 2610-1 being ranked first, and the ads 2600-2 through 2600-N having values 2610 less than value 2610-1 being ranked in descending order.

Selected ones of the ads determined to be relevant may be promoted (optional block 2140). Selection of which ads to be promoted may be based on the one or more quality parameters obtained in block 2110 above, or based on any other type of ad quality parameter, in addition to a CTR. Ads may be promoted based on a functional combination of the obtained quality parameter(s) and other parameters (e.g., CTR). In one implementation, the quality parameter QP may include the value $P_{GOOD\ AD}$ determined in block 1950 above. In other implementations, the quality parameter QP may include the value $P_{BAD\ AD}$ determined in block 1950 above. In one implementation, for example, if $P_{GOOD\ AD} * CTR$ is high (e.g., greater than a threshold), or if $P_{GOOD\ AD}/P_{BAD\ AD}$ is high (e.g., greater than a threshold), then the ad may be promoted.

Figure 27:
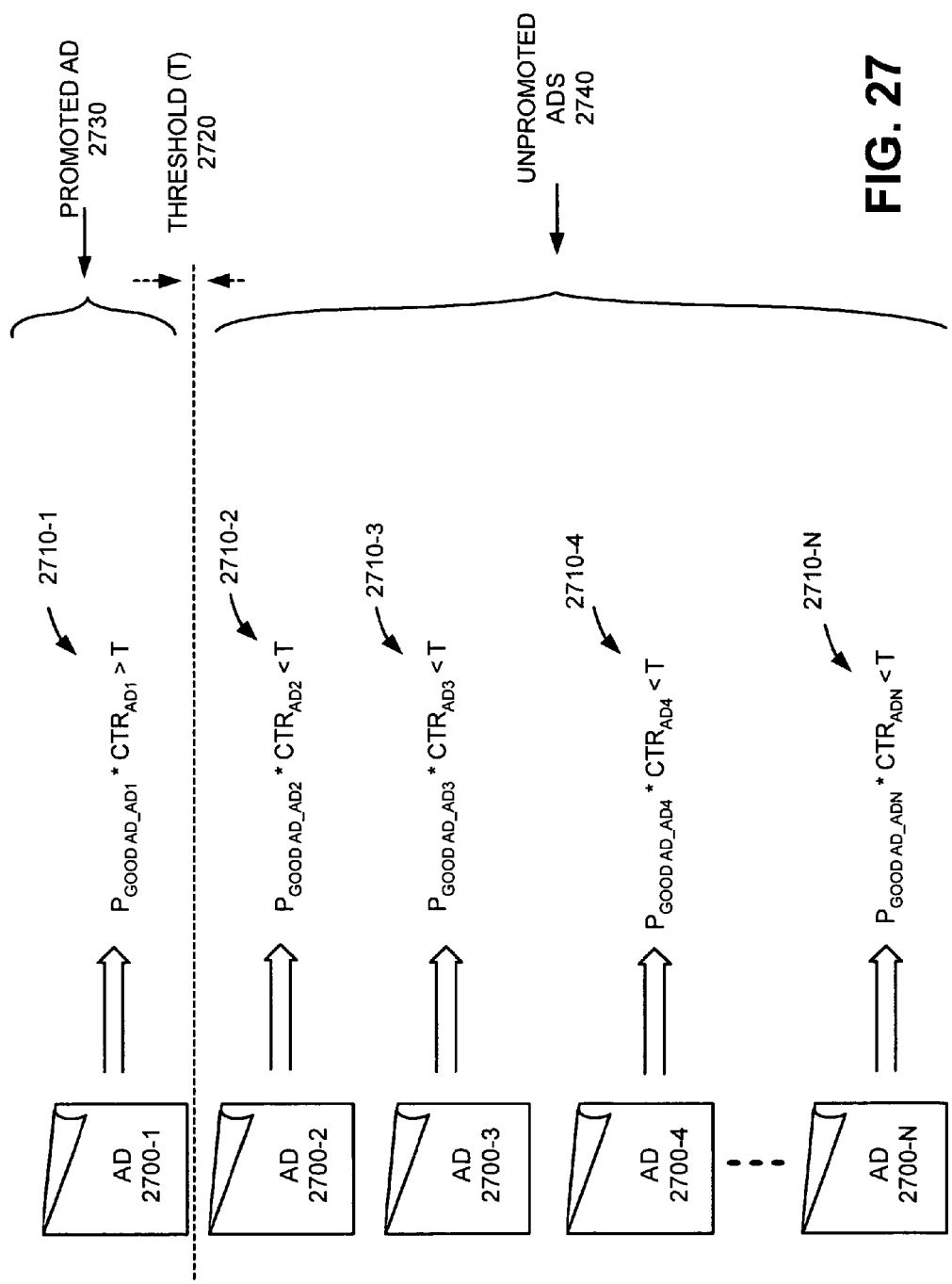
FIGS. 27-29 illustrate examples of advertisement promotion consistent with aspects of the invention.

FIG. 27 illustrates an example of the promoting of an ad of multiple ads 2700-1 through 2700-N. For each ad 2700, a value 2710 for $P_{GOOD\ AD} * CTR$ may be determined and compared to a threshold value (T) 2720. Ads having values 2710 greater than or equal to the threshold T 2720 may be promoted 2730 and ads having values 2710 less than the threshold T 2720 may not be promoted 2740.

Figure 28:
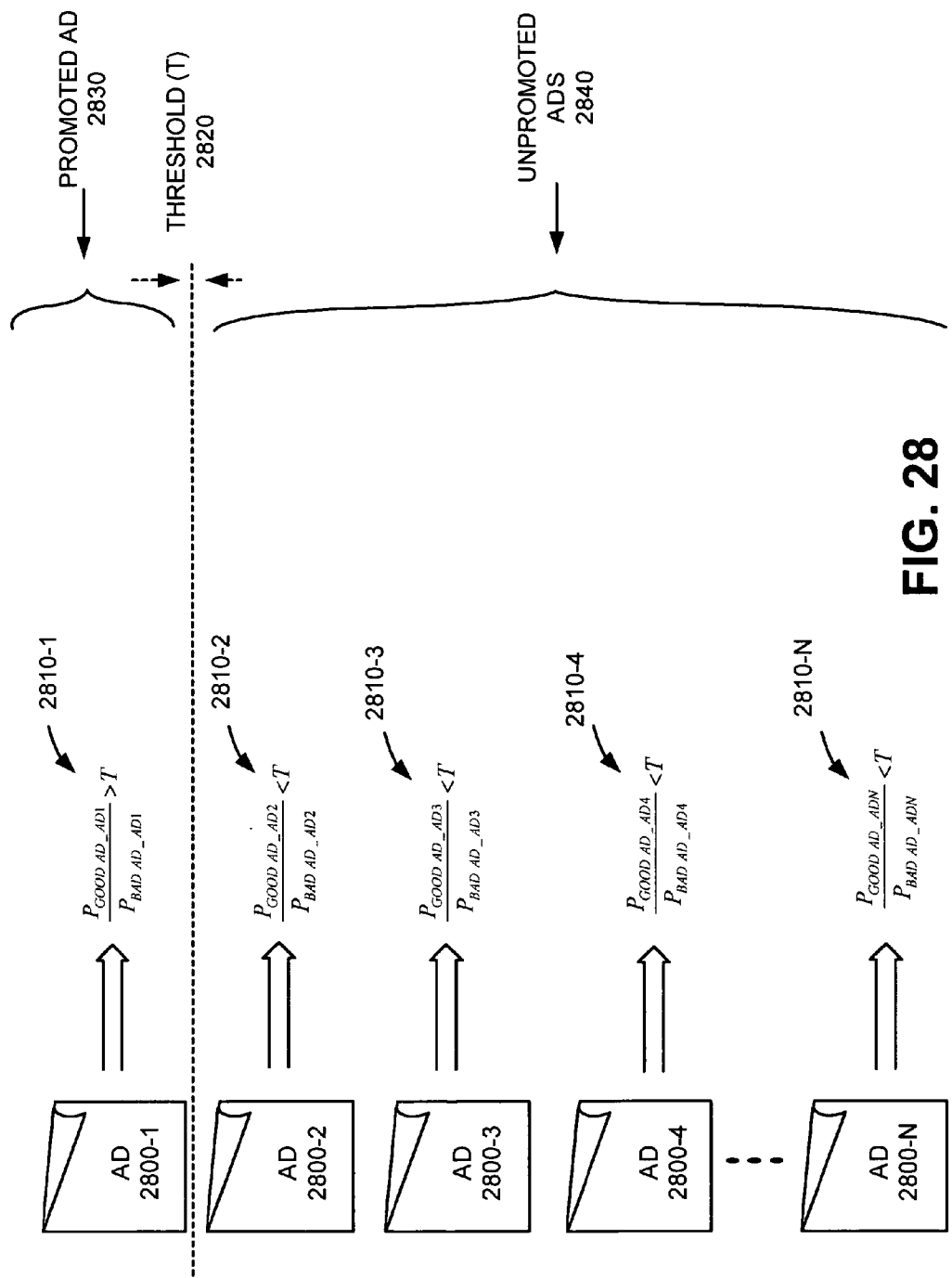

FIG. 28 illustrates another example of the promoting of an ad of multiple ads 2800-1 through 2800-N. For each ad 2800, a value 2810 for $P_{GOOD\ AD}/P_{BAD\ AD}$ may be determined and compared to a threshold value (T) 2820. Ads having values 2810 greater than or equal to the threshold T 2820 may be promoted 2840 and ads having values 2810 less than the threshold T 2820 may not be promoted 2840.

Figure 29:
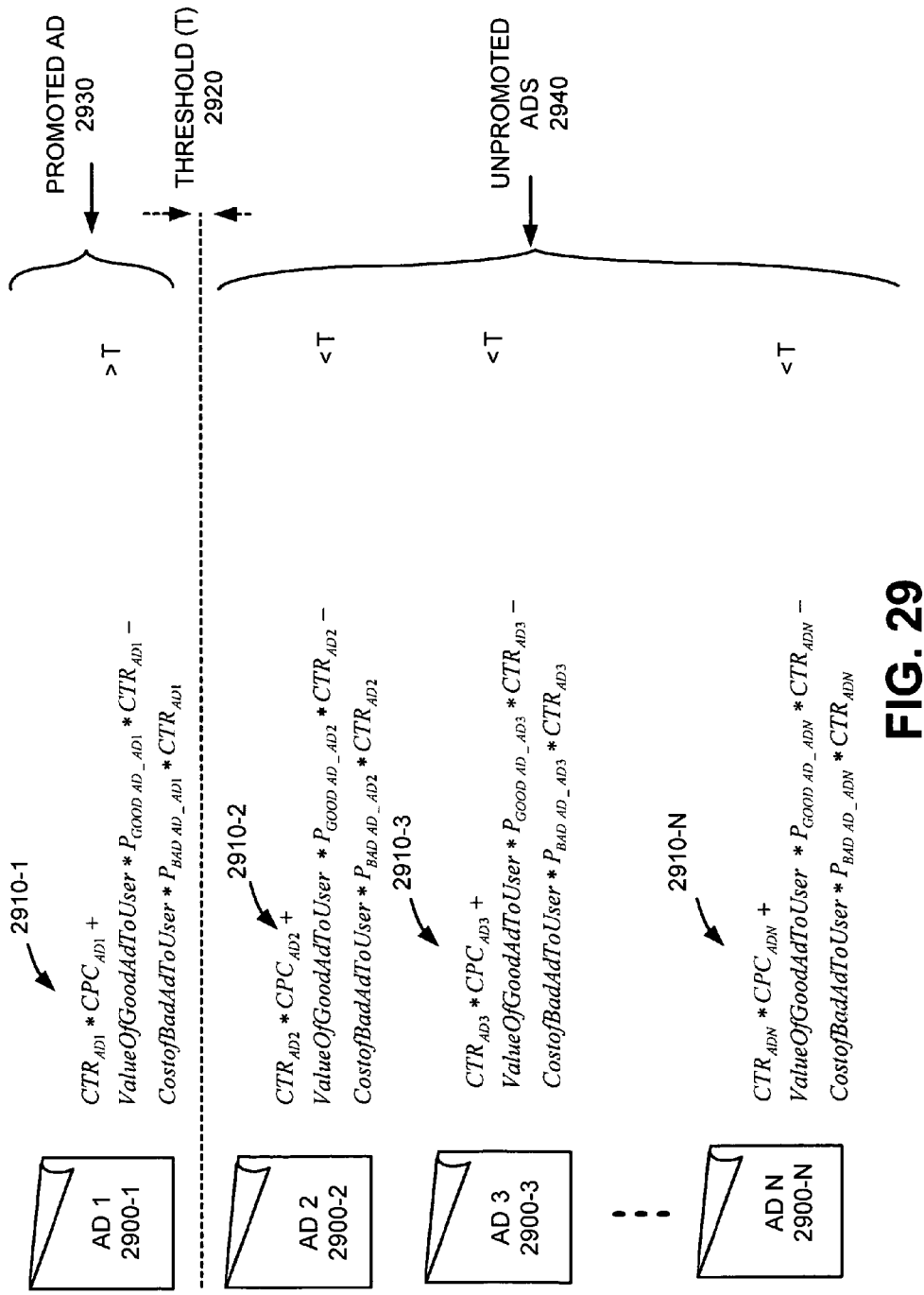

In another implementation, the function set forth in Eqn. (9) above may alternatively be used, with the value CostOfBadAdToUser being set higher than the value used in Eqn. (9) above for ranking ads. Setting the value of CostOfBadAdToUser higher than the value used in Eqn. (9) above indicates that it is more costly to promote a bad ad than to just show a bad ad. FIG. 29 illustrates a further example of the promoting of an ad of multiple ads 2900-1 through 2900-N. For each ad 2900, a value 2910 for Eqn. (9) above may be determined and compared to a threshold value (T) 2920. Ads having values 2910 greater than or equal to the threshold T 2920 may be promoted 2930 and ads having values 2910 less than the threshold T 2920 may not be promoted 2940.

Figure 30:
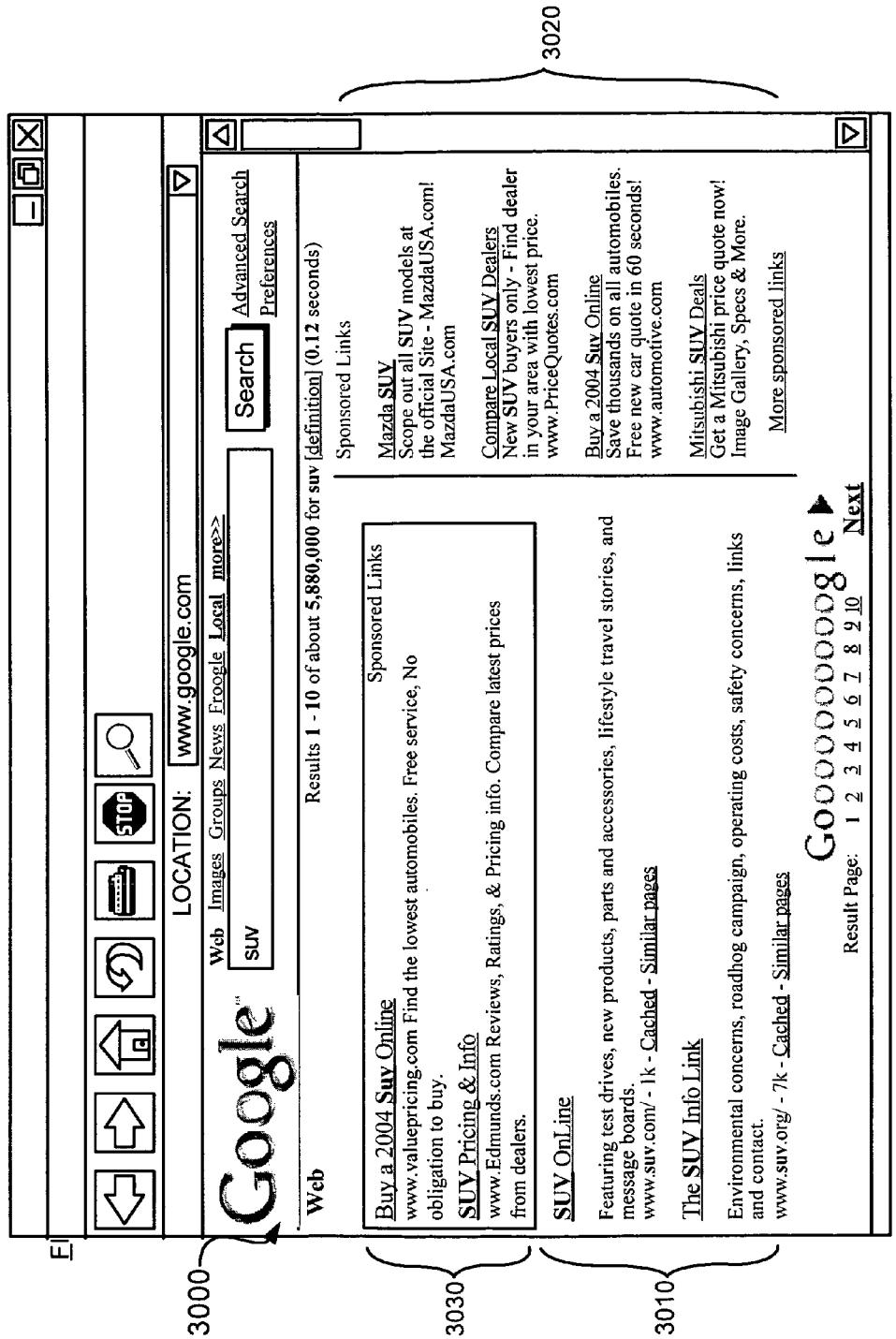
FIG. 30 illustrates an exemplary search result document that includes filtered, ranked and/or promoted advertisements consistent with an aspect of the invention.

Certain ones of the ads determined to be relevant may be selectively provided to a user based on the filtering, ranking and/or promoting performed in blocks 2120, 2130 and/or 2140 (block 2150). Relevant ads, which were not disabled in block 2120, may be provided to the user. Relevant ads, which do not include the disabled ads, may further be provided to the user in an order determined by the ranking function in block 2130. One or more of the relevant ads, which may not include the disabled ads, may be promoted as determined in block 2140. FIG. 30 illustrates a search result document 3000 in which search results 3010 are provided to a user that issued a search query. Ranked ads 3020, listed in ranked order, may further be included in the search result document 3000. The ranked ads 3020 may include, for example, links to ad landing documents which provide further details about the product or service being advertised. Promoted ads 3030, placed at a prominent or highlighted position, may additionally be included in the search result document 3000.

CONCLUSION

The foregoing description of preferred embodiments of the present invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 5, 14, 17, 18, 19 and 21, the order of the acts may be modified in other implementations consistent with the principles of the invention. Further, non-dependent acts may be performed in parallel.

In addition to the session features described above with respect to FIG. 5, conversion tracking may optionally be used in some implementations to derive a direct calibration between predictive values and user satisfaction. A conversion occurs when a selection of an advertisement leads directly to user behavior (e.g., a user purchase) that the advertiser deems valuable. An advertiser, or a service that hosts the advertisement for the advertiser, may track whether a conversion occurs for each ad selection. For example, if a user selects an advertiser's ad, and then makes an on-line purchase of a product shown on the ad landing document that is provided to the user in response to selection of the ad, then the advertiser, or service that hosts the ad, may note the conversion for that ad selection. The conversion tracking data may be associated with the identified ad selections. A statistical technique, such as, for example, logistic regression, regression trees, boosted stumps, etc., may be used to derive a direct calibration between predictive values and user happiness as measured by conversion.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, implemented by one or more processors associated with one or more server devices, the method comprising:

determining, using one or more processors associated with the one or more server devices, a first session feature associated with a selection of a first advertisement by a first user;

determining, using one or more processors associated with the one or more server devices, a second session feature associated with a selection of a second advertisement by a second user;

determining, using one or more processors associated with the one or more server devices, that the second session feature corresponds to the first session feature;

obtaining, using one or more processors associated with the one or more server devices, a first parameter ($QP_1$) associated with a quality of the second advertisement based on the first session feature, the first quality parameter ($QP_1$) comprising a probability that the second advertisement is of a certain measure of quality;

multiplying, using one or more processors associated with the one or more server devices, the first quality parameter ($QP_1$) with a click-through-rate (CTR), associated with the second advertisement, and a cost-per-click (CPC), associated with the second advertisement, to obtain a result;

ranking using one or more processors associated with the one or more server devices, the second advertisement, among a plurality of advertisements, based on the result; and providing, using one or more processors associated with the one or more server devices, the second advertisement to a third user based on ranking the second advertisement.

2. The method of claim 1, where the probability that the second advertisement is of the certain measure of quality comprises:

a probability that the second advertisement matches measured session features associated with a user selection of the second advertisement, or a probability that the second advertisement does not match the measured session features associated with the user selection of the second advertisement.

3. The method of claim 2, where the measured session features comprise at least two of:

a duration of the selection of the second advertisement;

a number of selections of other advertisements before or after the selection of the second advertisement;

a number of selections of search results before or after the selection of the second advertisement;

a number of selections of other types of results before or after the selection of the second advertisement;

a number of document accesses before or after the selection of the second advertisement;

a number of search queries before or after the selection of the second advertisement;

a number of search queries associated with a user session that shows advertisements, the advertisements including the second advertisement;
a number of repeat selections on the second advertisement; or
an indication of whether the second advertisement was a last advertisement selection for a given query or a last selection in a user session.

4. The method of claim 1, further comprising:
determining, based on the result, to provide the second advertisement to the third user.

5. The method of claim 1, further comprising:
comparing, using one or more processors associated with the one or more server devices, the result with a threshold value to determine whether to filter the second advertisement from the plurality of advertisements.

6. The method of claim 1, further comprising:
comparing, using one or more processors associated with the one or more server devices, the result with a threshold value to determine whether to promote the second advertisement among the plurality of advertisements.

7. The method of claim 1, further comprising:
determining, by one or more processors associated with the one or more server devices, a third session feature associated with the selection of the second advertisement by the second user;
obtaining, using one or more processors associated with the one or more server devices, a second quality parameter ($QP_2$) based on the third session feature corresponding to a fourth session feature associated with a selection of a third advertisement by a fourth user,
the second quality parameter ($QP_2$) indicating that indicates a different measure of quality of the second advertisement than the first quality parameter ($QP_1$); and
functionally combining, using one or more processors associated with the one or more server devices, the second quality parameter ($QP_2$) with the first quality parameter ($QP_1$), the CTR, and the CPC to obtain the result.

8. The method of claim 7, where functionally combining the second quality parameter ($QP_2$) with the first quality parameter ($QP_1$) and the CTR and CPC includes:
functionally combining the second quality parameter ($QP_2$) with the first quality parameter ($QP_1$), the CTR, CPC, and one or more constant values,
the one or more constant values representing an influence of the first measured session feature on the probability that the second advertisement is of the certain measure of quality relative to other measured session features associated with the second advertisement.

9. The method of claim 8, further comprising:
comparing, using one or more processors associated with the one or more server devices, the result with a threshold value to determine whether to promote the second advertisement among the plurality of advertisements.

10. A computer-readable memory device that stores computer-executable instructions, the instructions comprising:
one or more instructions that, when executed by one or more processors, cause the one or more processors to:
determine a first session feature associated with a selection of a first advertisement by a first user;
determine a second session feature associated with a selection of a second advertisement by a second user;
determine that the second session feature corresponds to the first session feature;
obtain a first parameter ($QP_1$) associated with a quality of the second advertisement based on the first session feature,
the first quality parameter ($QP_1$) corresponding to a probability that the second advertisement is of a certain measure of quality;
multiply the first quality parameter ($QP_1$) with a click-through-rate (CTR), associated with the second advertisement, and a cost-per-click (CPC), associated with the second advertisement, to obtain a result;
rank the second advertisement, among a plurality of advertisements, based on the result; and
provide the second advertisement to a third user based on ranking the second advertisement.

11. The computer-readable memory device of claim 10, where the probability that the second advertisement is of the certain measure of quality comprises:
a probability that the second advertisement matches measured session features associated with a user selection of the second advertisement, or
a probability that the second advertisement does not match the measured session features associated with the user selection of the second advertisement.

12. The computer-readable memory device of claim 11, where the measured session features comprise at least two of:
a duration of the selection of the second advertisement;
a number of selections of other advertisements before or after the selection of the second advertisement;
a number of selections of search results before or after the selection of the second advertisement;
a number of selections of other types of results before or after the selection of the second advertisement;
a number of document accesses before or after the selection of the second advertisement;
a number of search queries before or after the selection of the second advertisement;
a number of search queries associated with a user session that shows advertisements,
the advertisements including the second advertisement;
a number of repeat selections on the second advertisement; or
an indication of whether the second advertisement was a last advertisement selection for a given query or a last selection in a user session.

13. The computer-readable memory device of claim 10, further comprising:
one or more instructions to determine whether to provide the second advertisement to the third user.

14. The computer-readable memory device of claim 10, further comprising:
one or more instructions to compare the result with a threshold value to determine whether to filter the second advertisement from the plurality of advertisements.

15. The computer-readable memory device of claim 10, where the instructions further comprise:
one or more instructions to compare the result with a threshold value to determine whether to promote the second advertisement among the plurality of advertisements.

16. The computer-readable memory device of claim 10, where the instructions further comprise:
one or more instructions to obtain a second parameter ($QP_2$) associated with the quality of the second advertisement; and
one or more instructions to functionally combine the second quality parameter ($QP_2$) with the first quality parameter ($QP_1$), the CTR, and the CPC to obtain the result.

17. The computer-readable memory device of claim 16, where the one or more instructions to functionally combine the second quality parameter ($QP_2$) with the first quality parameter ($QP_1$), the CTR, and the CPC include:
  one or more instructions to functionally combine the second quality parameter ($QP_2$) with the first quality parameter ($QP_1$), the CTR, CPC, and one or more constant values,
    the one or more constant values representing an influence of the first measured session feature on the probability that the second advertisement is of the certain measure of quality relative to other measured session features associated with the second advertisement.

18. The computer-readable memory device of claim 17, where the instructions further comprise:
  one or more instructions to compare the result with a threshold to determine whether to promote the second advertisement among the plurality of advertisements.

19. A system comprising:
  at least one processor to:
    determine a first session feature associated with a selection of a first advertisement by a first user;
    determine a second session feature associated with a selection of a second advertisement by a second user;
    determine that the second session feature corresponds to the first session feature;
    use the first session feature to obtain a first parameter ($QP_1$) associated with a quality of the second advertisement,
    the first quality parameter ($QP_1$) corresponding to a probability that the second advertisement is of a certain measure of quality;
    multiply the first quality parameter ($QP_1$) with a click-through-rate (CTR), associated with the second advertisement, and a cost-per-click (CPC), associated with the second advertisement, to obtain a result;
    rank the second advertisement, among a plurality of advertisements, based on the result; and
    provide the second advertisement to a third user based on ranking the second advertisement.

20. The system of claim 19, where the probability that the second advertisement is of the certain measure of quality comprises:
  a probability that the second advertisement matches measured session features associated with a user selection of the second advertisement, or
  a probability that the second advertisement does not match the measured session features associated with the user selection of the second advertisement.

21. The system of claim 19, where the at least one processor is further to:
  obtain a second parameter ($QP_2$) associated with the quality of the second advertisement; and
  functionally combine the second quality parameter ($QP_2$) with the first quality parameter ($QP_1$), the CTR, and the CPC to obtain the result.

* * * * *

UNITED STATES PATENT AND TRADEMARK OFFICE
CERTIFICATE OF CORRECTION

PATENT NO. : 8,429,012 B2  
APPLICATION NO. : 12/890271  
DATED : April 23, 2013  
INVENTOR(S) : Daniel Wright et al.

Page 1 of 1

It is certified that error appears in the above-identified patent and that said Letters Patent is hereby corrected as shown below:

In the Claims:

Column 24, claim 1, line 36 should read: "ranking, using one or more processors associated with"

Column 25, claim 7, lines 30-31 should read: "the second quality parameter ($QP_2$) indicating a different measure of quality of the second"

Signed and Sealed this
Ninth Day of July, 2013

Teresa Stanek Rea
*Acting Director of the United States Patent and Trademark Office*